United States Patent
Ibrahim et al.

(10) Patent No.: US 11,622,365 B1
(45) Date of Patent: Apr. 4, 2023

(54) ON-OFF TRANSIENT POWER TIME MASK AT A UE SUPPORTING FULL-DUPLEX GNB OPERATION

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Tingfang Ji, San Diego, CA (US); Ahmed Attia Abotabl, San Diego, CA (US); Wanshi Chen, San Diego, CA (US); Huilin Xu, Temecula, CA (US); Renqiu Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/524,716

(22) Filed: Nov. 11, 2021

(51) Int. Cl.
*H04W 72/12* (2009.01)
*H04W 56/00* (2009.01)
*H04W 72/1268* (2023.01)

(52) U.S. Cl.
CPC ... *H04W 72/1268* (2013.01); *H04W 56/0045* (2013.01); *H04W 72/1242* (2013.01)

(58) Field of Classification Search
None
See application file for complete search history.

(56) References Cited

U.S. PATENT DOCUMENTS

| | | | |
|---|---|---|---|
| 10,862,662 B2 * | 12/2020 | Yi | H04L 27/2628 |
| 2015/0327220 A1 * | 11/2015 | Pan | H04W 72/1278 370/329 |
| 2018/0213499 A1 * | 7/2018 | Lee | H04W 56/0015 |
| 2019/0190687 A1 * | 6/2019 | Yi | H04L 5/1469 |
| 2021/0377825 A1 * | 12/2021 | Deenoo | H04W 48/12 |
| 2022/0225362 A1 * | 7/2022 | Yi | H04B 7/0695 |

FOREIGN PATENT DOCUMENTS

| WO | WO-2017036529 A1 * | 3/2017 | H04B 7/2656 |
|---|---|---|---|
| WO | WO-2021162620 A1 * | 8/2021 | H04L 5/001 |

* cited by examiner

*Primary Examiner* — Nathan S Taylor
(74) *Attorney, Agent, or Firm* — Holland & Hart LLP/Qualcomm Incorporated

(57) ABSTRACT

Methods, systems, and devices for wireless communication are described. A user equipment (UE) may identify that it is scheduled to transmit an uplink message during one or more symbols of a first transmission time interval (TTI) is scheduled to receive a downlink message during a second TTI subsequent to the first TTI. The UE may advance transmission of the uplink message in accordance with a timing advance (TA) value and a TA offset value, such that the timing advance offset value is zero. The UE may proceed to apply a transient power mitigation scheme to mitigate potential interference to reception of the downlink message during a transient power duration associated with turning off an uplink transmission chain used for transmitting the uplink message. In some examples, the transient power mitigation scheme may be applied based on the TA offset value being zero.

30 Claims, 17 Drawing Sheets

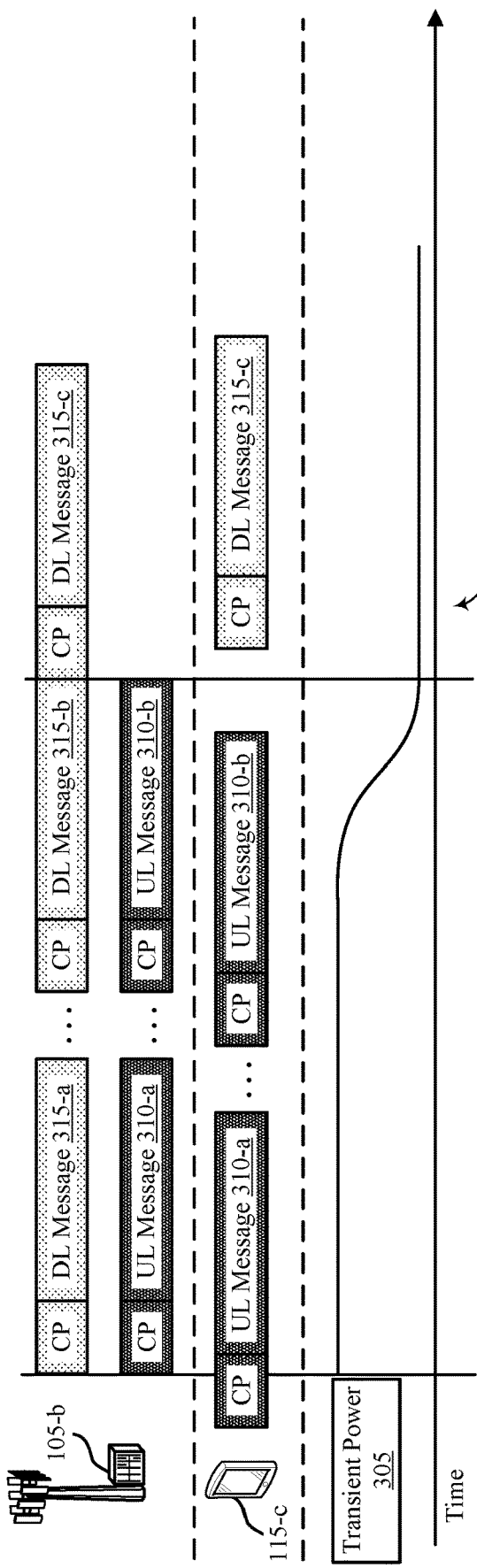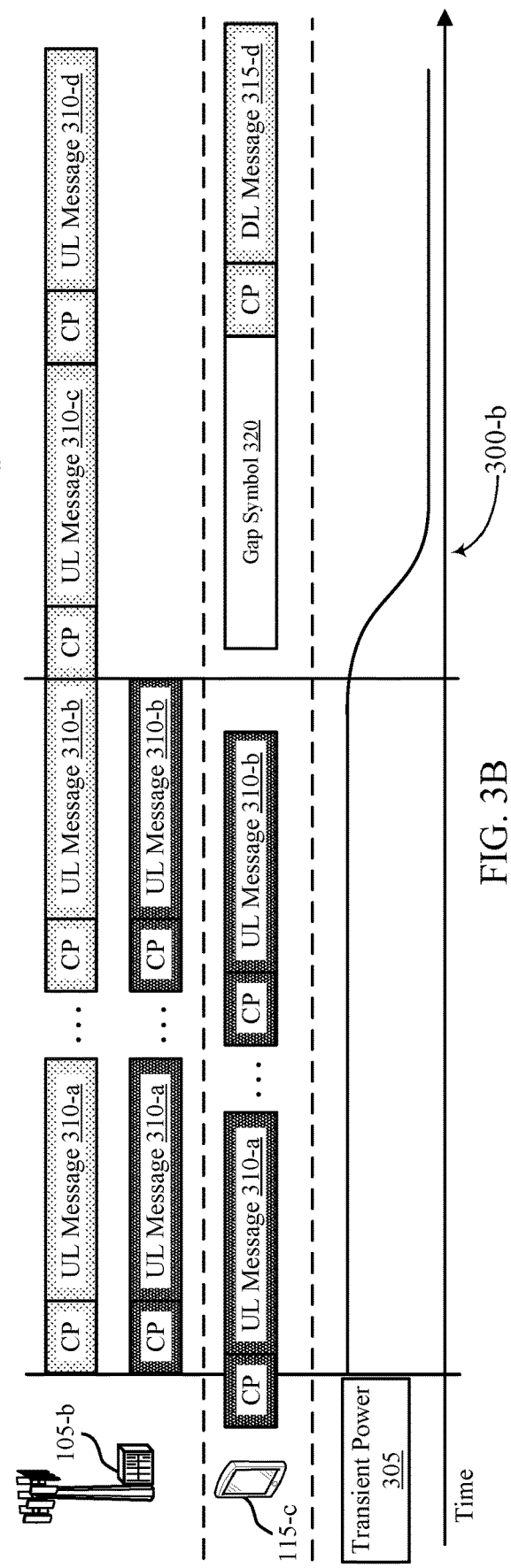
FIG. 3A
FIG. 3B

ON-OFF TRANSIENT POWER TIME MASK AT A UE SUPPORTING FULL-DUPLEX GNB OPERATION

FIELD OF TECHNOLOGY

The following relates to wireless communication, including an on-off transient power time mask at a user equipment (UE) supporting full-duplex next generation Node B (gNB) operation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support an on-off transient power time mask at a user equipment (UE) supporting full-duplex next generation Node B (gNB) operation. Generally, the described techniques provide for a UE to apply a transient power mitigation scheme to mitigate potential interference to reception of a downlink message. For example, when switching between transmission of uplink messages and subsequent reception of downlink messages, there may be a duration of time (e.g., a transient power duration) associated with turning off an uplink transmission chain at the UE. In some examples, the UE may start the transient power duration such that a majority of the transient period occurs during an uplink slot so as to not interfere with reception of a first downlink symbol from a base station. In some examples, the base station may configure one or more gap symbols between uplink and downlink transmissions such that the transient period occurs during the gap period so as to not interfere with reception of a first downlink symbol from the base station. In some examples, the base station may consider the priority of the last uplink symbol from the UE when determining whether to configure one or more gap symbols. In some examples, the UE may operate in accordance with a comb allocation (e.g., comb2 or comb4) in the frequency domain corresponding to multiple uplink repetitions in the time domain. In such cases, the UE may drop the last uplink repetition and initiate the transient period.

A method for wireless communication at a user equipment (UE) is described. The method may include identifying that the UE is scheduled to transmit an uplink message during one or more symbols of a first transmission time interval (TTI) and that the UE is scheduled to receive a downlink message during a second TTI subsequent to the first TTI, advancing transmission of the uplink message in accordance with a timing advance (TA) value and a TA offset value, where the TA offset value is zero or is within a threshold range of zero, and applying a transient power mitigation scheme to mitigate potential interference to reception of the downlink message during a transient power duration associated with turning off an uplink transmission chain used for transmitting the uplink message, the transient power mitigation scheme being applied based on the TA offset value being zero or within the threshold range of zero.

An apparatus for wireless communication at a UE is described. The apparatus may include a processor, memory coupled with the processor, and instructions stored in the memory. The instructions may be executable by the processor to cause the apparatus to identify that the UE is scheduled to transmit an uplink message during one or more symbols of a first TTI and that the UE is scheduled to receive a downlink message during a second TTI subsequent to the first TTI, advance transmission of the uplink message in accordance with a TA value and a TA offset value, where the TA offset value is zero or is within a threshold range of zero, and apply a transient power mitigation scheme to mitigate potential interference to reception of the downlink message during a transient power duration associated with turning off an uplink transmission chain used for transmitting the uplink message, the transient power mitigation scheme being applied based on the TA offset value being zero or within the threshold range of zero.

Another apparatus for wireless communication at a UE is described. The apparatus may include means for identifying that the UE is scheduled to transmit an uplink message during one or more symbols of a first TTI and that the UE is scheduled to receive a downlink message during a second TTI subsequent to the first TTI, means for advancing transmission of the uplink message in accordance with a TA value and a TA offset value, where the TA offset value is zero or is within a threshold range of zero, and means for applying a transient power mitigation scheme to mitigate potential interference to reception of the downlink message during a transient power duration associated with turning off an uplink transmission chain used for transmitting the uplink message, the transient power mitigation scheme being applied based on the TA offset value being zero or within the threshold range of zero.

A non-transitory computer-readable medium storing code for wireless communication at a UE is described. The code may include instructions executable by a processor to identify that the UE is scheduled to transmit an uplink message during one or more symbols of a first TTI and that the UE is scheduled to receive a downlink message during a second TTI subsequent to the first TTI, advance transmission of the uplink message in accordance with a TA value and a TA offset value, where the TA offset value is zero or is within a threshold range of zero, and apply a transient power mitigation scheme to mitigate potential interference to reception of the downlink message during a transient power duration associated with turning off an uplink transmission chain used for transmitting the uplink message, the transient power mitigation scheme being applied based on the TA offset value being zero or within the threshold range of zero.

Some examples of the method, apparatuses, and non-transitory computer-readable medium described herein may further include operations, features, means, or instructions for determining that a combination of the TA value and the TA offset value may be less than the transient power duration, where applying the transient power mitigation scheme may be further based on the combination of the TA value and the TA offset value being less than the transient power duration.

In some examples of the method, apparatuses, and non-transitory computer-readable medium described herein, applying the transient power mitigation scheme may include operations, features, means, or instructions for selecting from a set of multiple schemes, where a first scheme includes starting the transient power duration such that a majority of the transient power duration occurs in the first TTI, and a second scheme includes insertion of a number of gap symbols between the transmission of the uplink message and the reception of the downlink message.

In some examples of the method, apparatuses, and non-transitory computer-readable medium described herein, selecting from the set of multiple schemes may include operations, features, means, or instructions for determining to use either the first scheme or the second scheme based on a priority of a last symbol of the first TTI.

In some examples of the method, apparatuses, and non-transitory computer-readable medium described herein, determining to use either the first scheme or the second scheme may include operations, features, means, or instructions for using the second scheme based on the priority of the last symbol of the first TTI being above a threshold, where the second scheme includes the insertion of a gap symbol during one or more initial symbols of the second TTI.

In some examples of the method, apparatuses, and non-transitory computer-readable medium described herein, determining to use either the first scheme or the second scheme may include operations, features, means, or instructions for using the first scheme based on the priority of the last symbol of the first TTI being below a threshold.

In some examples of the method, apparatuses, and non-transitory computer-readable medium described herein, determining to use either the first scheme or the second scheme may include operations, features, means, or instructions for receiving, at the UE, a gap symbol indication or an indication to apply a time mask within the last symbol of the first TTI and using the second scheme based on the priority of the last symbol of the first TTI and the gap symbol indication or the indication to apply the time mask within the last symbol of the first TTI.

Some examples of the method, apparatuses, and non-transitory computer-readable medium described herein may further include operations, features, means, or instructions for determining the priority of the last symbol of the first TTI based on whether the uplink message may be aperiodic, semi-persistent, or periodic, on a channel type associated with the uplink message, on a content of the uplink message, on a pair of channel types associated with the uplink message and the downlink message, on the content of the uplink message and a content of the downlink message, or a combination thereof.

In some examples of the method, apparatuses, and non-transitory computer-readable medium described herein, applying the transient power mitigation scheme may include operations, features, means, or instructions for starting the transient power duration during a last symbol of the first TTI such that a majority of the transient power duration occurs in the first TTI.

Some examples of the method, apparatuses, and non-transitory computer-readable medium described herein may further include operations, features, means, or instructions for determining the transient power duration and an associated start value for the transient power duration based on a transient period start table configured at the UE, where the transient period start table includes a set of one or more transient power durations and associated start values.

In some examples of the method, apparatuses, and non-transitory computer-readable medium described herein, each transient power duration of the set of one or more transient power durations may be associated with a range of start values.

Some examples of the method, apparatuses, and non-transitory computer-readable medium described herein may further include operations, features, means, or instructions for selecting a start value from the range of start values based on a priority of the last symbol of the first TTI and a priority of a first symbol of the second TTI, a priority of channels associated with the uplink message and the downlink message, receiving a radio resource control message indicating the start value, or a combination thereof.

In some examples of the method, apparatuses, and non-transitory computer-readable medium described herein, applying the transient power mitigation scheme may include operations, features, means, or instructions for applying a number of gap symbols between the transmission of the uplink message and the reception of the downlink message.

Some examples of the method, apparatuses, and non-transitory computer-readable medium described herein may further include operations, features, means, or instructions for determining the number of gap symbols based on a bandwidth part subcarrier spacing associated with the UE while transitioning from the first TTI to the second TTI.

Some examples of the method, apparatuses, and non-transitory computer-readable medium described herein may further include operations, features, means, or instructions for determining to place the number of gap symbols at an end of the first TTI or at a start of the second TTI based on a priority of the uplink message and a priority of the downlink message.

Some examples of the method, apparatuses, and non-transitory computer-readable medium described herein may further include operations, features, means, or instructions for receiving an indication for a virtual subcarrier spacing increase for a last symbol of the first TTI and configuring the virtual subcarrier spacing increase using a comb frequency allocation corresponding to one or more time domain repetitions.

Some examples of the method, apparatuses, and non-transitory computer-readable medium described herein may further include operations, features, means, or instructions for determining to drop one or more of the one or more time domain repetitions, where the uplink message may be allocated to a pattern of frequency tones based on the comb frequency allocation.

In some examples of the method, apparatuses, and non-transitory computer-readable medium described herein, the comb frequency allocation may be one of all even tones within a comb or all odd tones within the comb and the uplink message includes a demodulation reference signal during the last symbol of the first TTI.

A method for wireless communication at a base station is described. The method may include identifying that a UE is scheduled to transmit an uplink message during one or more symbols of a first TTI and that the UE is scheduled to receive a downlink message during a second TTI subsequent to the first TTI, where receipt of the uplink message is to be in accordance with a TA value and a TA offset value, and where the base station is operating in a full-duplex mode during one or more of the first TTI and the second TTI, determining that the TA offset value is zero or is within a threshold range of zero, and transmitting to the UE an indication of an applied transient power mitigation scheme to be applied by the UE based on the TA offset being zero or within the threshold range of zero, the applied transient power mitigation scheme to mitigate potential interference to reception of the downlink message, at the UE, during a transient power duration associated with the UE turning off an uplink transmission chain used for transmitting the uplink message.

An apparatus for wireless communication at a base station is described. The apparatus may include a processor, memory coupled with the processor, and instructions stored in the memory. The instructions may be executable by the processor to cause the apparatus to identify that a UE is scheduled to transmit an uplink message during one or more symbols of a first TTI and that the UE is scheduled to receive a downlink message during a second TTI subsequent to the first TTI, where receipt of the uplink message is to be in accordance with a TA value and a TA offset value, and where the base station is operating in a full-duplex mode during one or more of the first TTI and the second TTI, determine that the TA offset value is zero or is within a threshold range of zero, and transmit to the UE an indication of an applied transient power mitigation scheme to be applied by the UE based on the TA offset being zero or within the threshold range of zero, the applied transient power mitigation scheme to mitigate potential interference to reception of the downlink message, at the UE, during a transient power duration associated with the UE turning off an uplink transmission chain used for transmitting the uplink message.

Another apparatus for wireless communication at a base station is described. The apparatus may include means for identifying that a UE is scheduled to transmit an uplink message during one or more symbols of a first TTI and that the UE is scheduled to receive a downlink message during a second TTI subsequent to the first TTI, where receipt of the uplink message is to be in accordance with a TA value and a TA offset value, and where the base station is operating in a full-duplex mode during one or more of the first TTI and the second TTI, means for determining that the TA offset value is zero or is within a threshold range of zero, and means for transmitting to the UE an indication of an applied transient power mitigation scheme to be applied by the UE based on the TA offset being zero or within the threshold range of zero, the applied transient power mitigation scheme to mitigate potential interference to reception of the downlink message, at the UE, during a transient power duration associated with the UE turning off an uplink transmission chain used for transmitting the uplink message.

A non-transitory computer-readable medium storing code for wireless communication at a base station is described. The code may include instructions executable by a processor to identify that a UE is scheduled to transmit an uplink message during one or more symbols of a first TTI and that the UE is scheduled to receive a downlink message during a second TTI subsequent to the first TTI, where receipt of the uplink message is to be in accordance with a TA value and a TA offset value, and where the base station is operating in a full-duplex mode during one or more of the first TTI and the second TTI, determine that the TA offset value is zero or is within a threshold range of zero, and transmit to the UE an indication of an applied transient power mitigation scheme to be applied by the UE based on the TA offset being zero or within the threshold range of zero, the applied transient power mitigation scheme to mitigate potential interference to reception of the downlink message, at the UE, during a transient power duration associated with the UE turning off an uplink transmission chain used for transmitting the uplink message.

Some examples of the method, apparatuses, and non-transitory computer-readable medium described herein may further include operations, features, means, or instructions for determining that a combination of the TA value and the TA offset value may be less than a transient power duration of the UE, where transmitting the indication of the applied transient power mitigation scheme may be further based on the combination of the TA value and the TA offset value being less than the transient power duration.

In some examples of the method, apparatuses, and non-transitory computer-readable medium described herein, transmitting the indication of the applied transient power mitigation scheme may include operations, features, means, or instructions for indicating a scheme from a set of multiple schemes, where a first scheme includes starting the transient power duration such that a majority of the transient power duration occurs in the first TTI, and a second scheme includes insertion of a number of gap symbols between the transmission of the uplink message and the reception of the downlink message.

Some examples of the method, apparatuses, and non-transitory computer-readable medium described herein may further include operations, features, means, or instructions for selecting either the first scheme or the second scheme based on a priority of a last symbol of the first TTI.

In some examples of the method, apparatuses, and non-transitory computer-readable medium described herein, indicating the scheme may include operations, features, means, or instructions for identifying for the UE to use the second scheme based on the priority of the last symbol of the first TTI being above a threshold, where the second scheme includes the insertion of a gap symbol during one or more initial symbols of the second TTI.

In some examples of the method, apparatuses, and non-transitory computer-readable medium described herein, indicating the scheme may include operations, features, means, or instructions for identifying for the UE to use the first scheme based on the priority of the last symbol of the first TTI being below a threshold.

In some examples of the method, apparatuses, and non-transitory computer-readable medium described herein, indicating the scheme may include operations, features, means, or instructions for transmitting, to the UE, a gap symbol indication or an indication to apply a time mask within the last symbol of the first TTI and identifying for the UE to use the second scheme based on the priority of the last symbol of the first TTI and the gap symbol indication or the indication to apply the time mask within the last symbol of the first TTI.

Some examples of the method, apparatuses, and non-transitory computer-readable medium described herein may further include operations, features, means, or instructions for determining the priority of the last symbol of the first TTI based on whether the uplink message may be aperiodic, semi-persistent, or periodic, on a channel type associated with the uplink message, on a content of the uplink message, on a pair of channel types associated with the uplink message and the downlink message, on the content of the uplink message and a content of the downlink message, or a combination thereof.

In some examples of the method, apparatuses, and non-transitory computer-readable medium described herein, transmitting the indication of the applied transient power mitigation scheme may include operations, features, means, or instructions for scheduling a number of gap symbols between the transmission of the uplink message and the reception of the downlink message.

Some examples of the method, apparatuses, and non-transitory computer-readable medium described herein may further include operations, features, means, or instructions for scheduling the number of gap symbols based on a bandwidth part subcarrier spacing associated with the UE while transitioning from the first TTI to the second TTI.

BRIEF DESCRIPTION OF THE DRAWINGS

FIGS. 3A and 3B illustrate examples of transmission timelines that supports an on-off transient power time mask at a UE supporting full-duplex gNB operation in accordance with aspects of the present disclosure.

DETAILED DESCRIPTION

Figure 1:
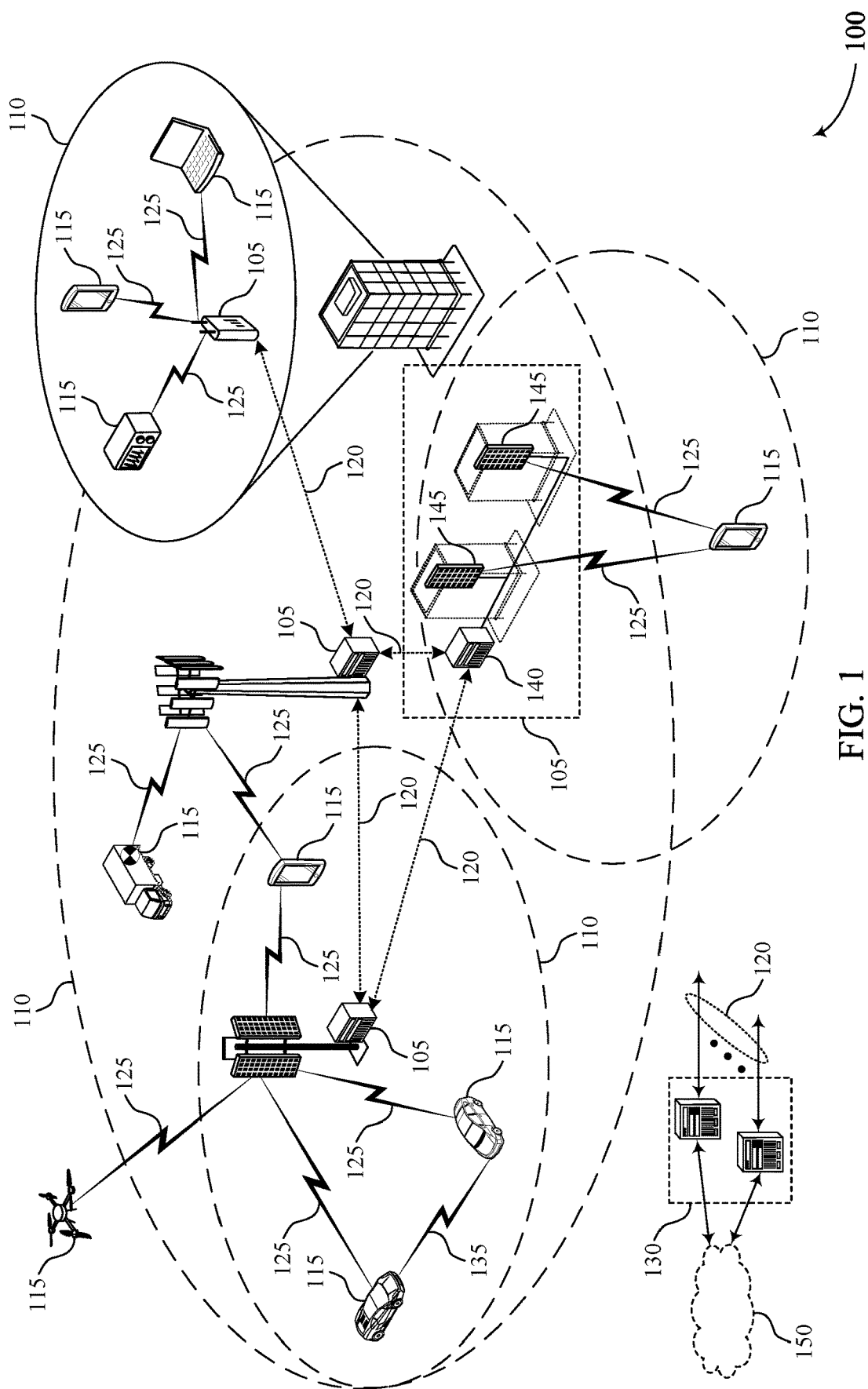
FIG. 1 illustrates an example of a wireless communications system that supports an on-off transient power time mask at a user equipment (UE) supporting full-duplex next generation Node B (gNB) operation in accordance with aspects of the present disclosure.

In some examples of wireless communications, a user equipment (UE) that is scheduled to transmit an uplink message to a base station may advance the transmission time of the message in order to account for propagation delay. This timing advance (TA) ensures that the uplink message may be received at the base station at a time during which the base station expects to receive the message, regardless of the distance the UE is from the base station. In addition, a UE may further advance the transmission of the uplink message by an additional timing advance offset (e.g., a TA offset). By advancing the uplink message by both the TA value and the TA offset value, the UE can deliver the uplink message at the appropriate time and also preserve enough time between transmission of the uplink message and a subsequent reception of a downlink message to allow for the switching off of the UE's uplink transmission chain.

In some cases, a UE may achieve a reduced error vector magnitude (EVM) for wireless communications when the UE operates in accordance with a synchronous transmission timeline at a gNB operating in full-duplex where the TA offset is set to zero. However, by removing the TA offset, the time between an uplink transmission and a subsequent downlink reception at the UE may not be sufficient to allow for power-down of the UE uplink transmission chain (e.g., a transient power duration). As such, the UE may experience interference of the first downlink symbols received from the base station.

According to the techniques described herein, the UE may apply a transient power mitigation scheme to mitigate potential interference to reception of the downlink message during a transient power duration associated with turning off an uplink transmission chain. In some examples, the UE may start the transient power duration such that a majority of the transient period occurs during an uplink slot so as to not interfere with reception of a first downlink symbol from a base station. The UE may determine the transient power duration and an associated start value for the transient power duration based on a transient period start table configured at the UE. In some examples, the transient period start table may include a set of one or more transient power durations and associated start values.

In some examples, the base station may configure one or more gap symbols between uplink and downlink transmissions such that the transient period occurs during the gap period so as to not interfere with reception of a first downlink symbol from the base station. In some examples, the base station may consider the priority of the last uplink symbol from the UE when determining whether to configure one or more gap symbols. For instance, if the last uplink symbol has a higher priority than the first downlink symbol, the base station may include a gap symbol.

In some cases, the UE may operate in accordance with a comb allocation (e.g., comb2 or comb4) in the frequency domain corresponding to multiple uplink repetitions in the time domain. In such cases, the UE may drop the last uplink repetition and initiate the transient period.

Aspects of the disclosure are initially described in the context of wireless communications systems. Aspects of the disclosure are further illustrated by transmission timelines and a process flow. Aspects of the disclosure are further illustrated by and described with reference to apparatus diagrams, system diagrams, and flowcharts that relate to an on-off transient power time mask at a UE supporting full-duplex gNB operation.

FIG. 1 illustrates an example of a wireless communications system 100 that supports an on-off transient power time mask at a UE supporting full-duplex next Generation Node B (gNB) operation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels.

In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples of wireless communications system 100, a UE 115 may be scheduled to transmit an uplink message to a base station 105, and may determine to advance the transmission time of the message in order to account for propagation delay. This TA ensures that the uplink message is received at the base station 105 at a time during which the base station 105 expects to receive the message, regardless of the distance the UE is from the base station. In addition, a UE may further advance the transmission of the uplink message by an additional TA offset, which may allow for enough time for the UE to switch off an uplink message transmission chain and prepare for a subsequent reception of a downlink message from the base station 105 (e.g., a transient power duration).

If the base station 105 and the UE 115 operate in accordance with a synchronous transmission timeline, however, the TA offset may be set to zero. As such, the UE may apply a transient power mitigation scheme to mitigate potential interference to reception of the downlink message during a transient power duration associated with turning off the uplink transmission chain. In some examples, the UE may start the transient power duration such that a majority of the transient period occurs during an uplink slot so as to not interfere with reception of a first downlink symbol from a base station. In some examples, the base station may configure one or more gap symbols between uplink and downlink transmissions such that the transient period occurs during the gap period so as to not interfere with reception of a first downlink symbol from the base station. Further discussion of applying a transient power mitigation scheme are described herein, including with reference to FIGS. 2-5.

Figure 2A:
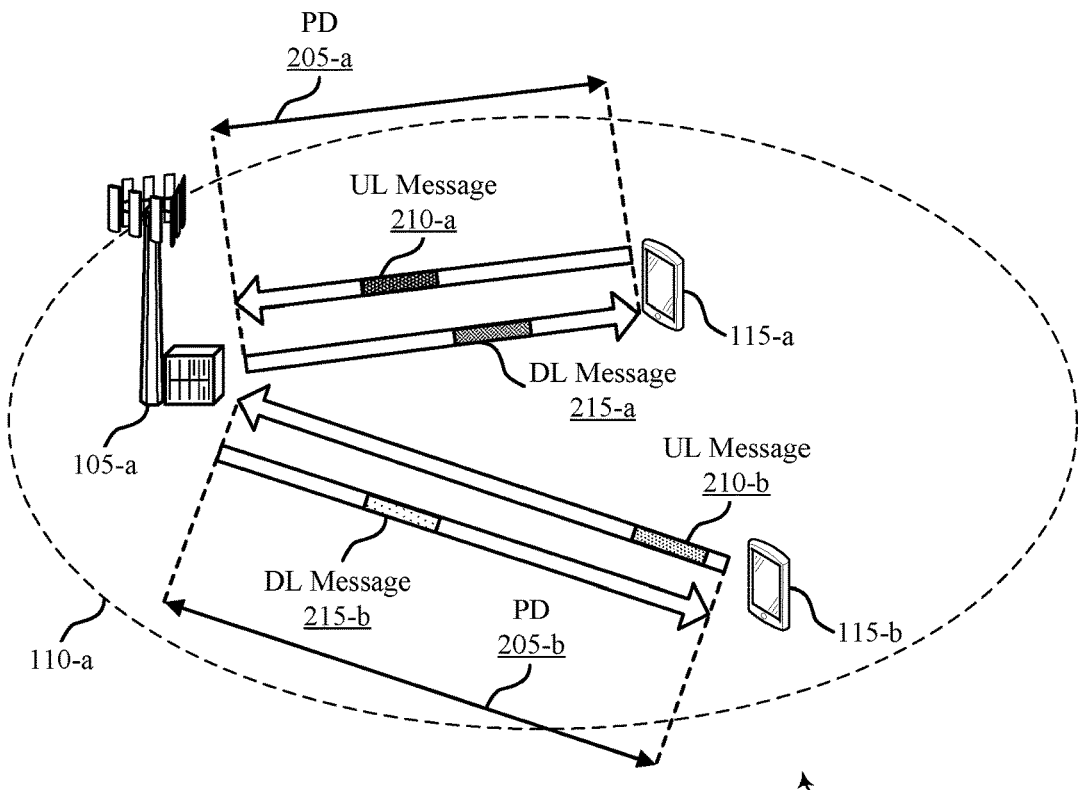
FIGS. 2A and 2B illustrate respective examples of a wireless communications system and a transmission timeline that supports an on-off transient power time mask at a UE supporting full-duplex gNB operation in accordance with aspects of the present disclosure.
Figure 2B:
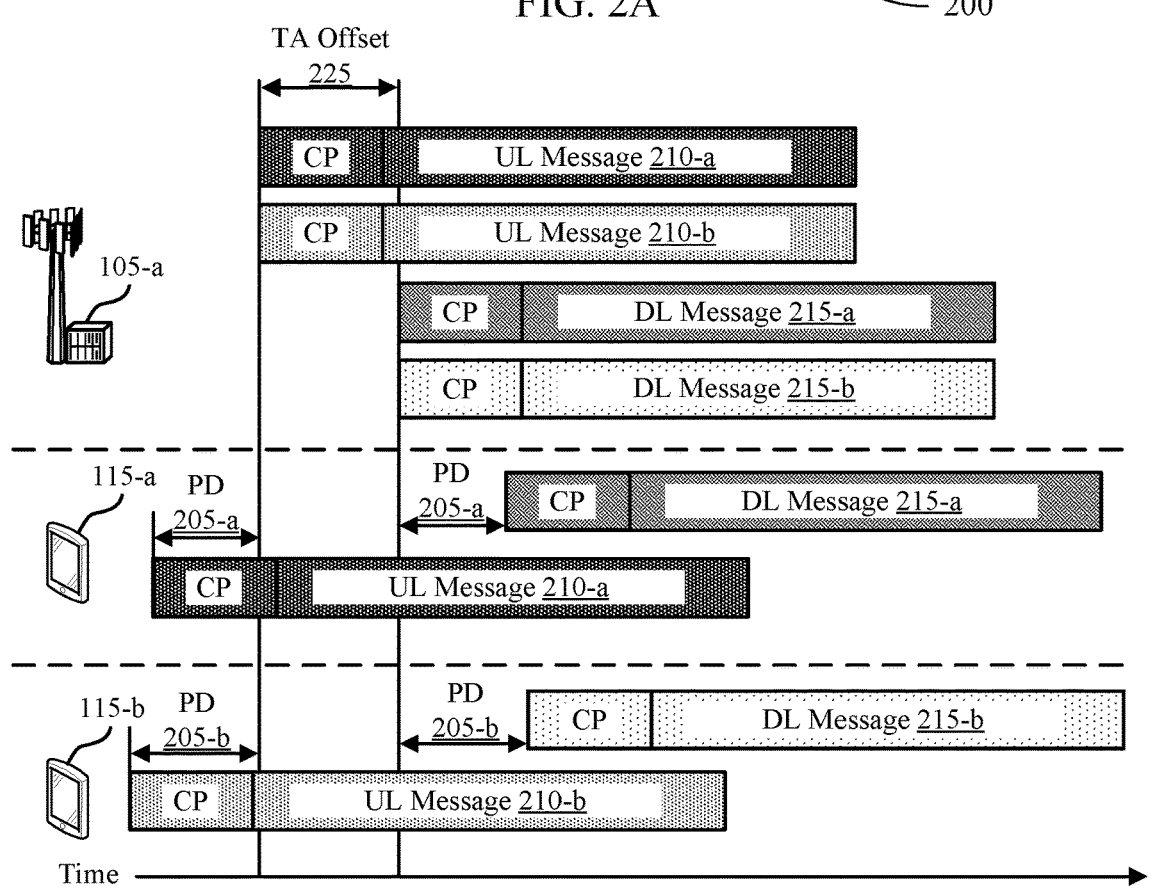

FIGS. 2A and 2B illustrate respective examples of a wireless communications system 200 and a transmission timeline 220 that each support an on-off transient power time mask at a UE supporting full-duplex gNB operation in accordance with aspects of the present disclosure. The wireless communications system 200 may implement or be implemented by one or more aspects of the wireless communications system 100. For example, the wireless communications system 200 may include a UE 115-a, a UE 115-b, and a base station 105-a operating within a coverage area 110-a which may be respective examples of UEs 115, a base station 105, and a coverage area 110 as described with reference to FIG. 1. In some examples, the UEs 115 may operate in accordance with an on-off transient power time mask when communicating with the base station 105-a. Specifically, the UEs 115 may benefit from defining a duration of time to transition power states (e.g., a transient period) as to not interfere with a following downlink transmission from the base station 105-a. It should be noted that, while examples are discussed below, any number of devices and device types may be used to accomplish implementations described in the present disclosure.

With reference to FIG. 2A, the wireless communications system 200, the base station 105-a and the UEs 115 may operate in accordance with a full-duplex communication mode. For example, the base station 105-*a* may concurrently receive an uplink message 210-*a* and an uplink message 210-*b* from the UE 115-*a* and the UE 115-*b*, respectively, while transmitting a downlink message 215-*a* and a downlink message 215-*b*. In some examples, a UE 115 may participate in a half-duplex mode where the UE 115 may transmit one or more uplink messages 210 to one or more TRPs located at one or more base stations 105 at a first time and may receive one or more downlink messages 215 from the one or more base stations 105 at a second time. In some cases, the base station 105-*a* may operate in accordance with different types of full-duplex operations. For example, the base station 105-*a* may operate in accordance with an in-band full-duplex mode (IBDF) in which the base station 105-*a* may transmit and receive uplink messages 210 and downlink messages 215 using time and frequency resources that either partially or fully overlap. Alternatively, the base station 105-*a* may operate in accordance with a sub-band full-duplex (SBFD) (e.g., a flexible duplex mode) in which the base station 105-*a* may transmit and receive uplink messages 210 and downlink messages 215 using the same time resources but separate frequency resources that are separated by a frequency band guard.

In some examples of full-duplex operation, the base station 105-*a* may utilize one or more techniques to mitigate self-interference. In some examples, the base station 105-*a* may use two antenna panels at the base station 105-*a* for simultaneous transmission and reception operations. For example, a first antenna panel may be used for downlink transmissions at the edges of a frequency band and a second antenna panel may be used for uplink reception at the middle of the frequency band. In some examples, the base station 105-*a* may operate in the SBFD mode such that the downlink and uplink communications are in different portions of the frequency band and are separated by a guard frequency. In such examples, reception weighted overlap and add (WOLA) techniques may reduce an adjacent channel leakage ratio (ACLR), an analog low pass filter (LPF) may be used to improve an analog-to-digital-converter (ADC) dynamic range, and improved receiving automatic gain control (AGC) states may improve network function (NF). In some examples, the base station 105-*a* may utilize digital integrated circuits of the ACLR leakage in a non-liner model for each transmission-reception resource pair.

In some examples of operating in accordance with a full-duplex mode, each communication slot may be defined as a downlink-plus-uplink (e.g., D+U) slot which may be used for both uplink and downlink transmissions. The downlink and uplink transmissions may occur in at least partially overlapping bands (e.g., IBFD mode) or adjacent bands (e.g., SBFD mode). If a UE 115 is operating in accordance with a half-duplex mode, the UE 115 may either transmit in the uplink band or receive in the downlink band for a given D+U symbol. If a UE 115 is operating in accordance with a full-duplex mode, the UE 115 may transmit in the uplink band, receive in the downlink band, or both during the same D+U slot. As such, a D+U slot may contain downlink symbols, uplink symbols, or full-duplex symbols.

In wireless communications system 200 the wireless device may experience propagation delay (PD) 205. For example, if the UE 115-*a* transmits the uplink message 210-*a* to the base station 105-*a*, there may be an associated PD 205-*a* that may be related to the distance the UE 115-*a* is from the base station 105-*a*. For instance as illustrated in FIG. 2A, the PD 205-*a* associated with the base station 105-*a* and the UE 115-*a* and the PD 205-*b* associated with the base station 105-*a* and the UE 115-*b* may be different and vary depending on how far away the UE 115-*a* and the UE 115-*b* are from the base station 105-*a* at a given time. In some examples of a PD 205, the timing at which the base station 105-*a* transmits a downlink message 215 and at which the base station 105-*a* receives an uplink message 210 from a UE 115 may cause a large enough delay resulting in uplink and downlink interference. Moreover, based on the PD 205-*a* and the PD 205-*b* in some examples being different, the reception of uplink messages 210-*a* and 215-*b* at the base station 105-*a* may result in inter-symbol interference. To combat inter-symbol interference, the UE 115-*a* and the UE 115-*b* may utilize a TA mechanism in which the UE 115-*a* and the UE 115-*b* may advance an uplink transmission by an amount of time (e.g., approximately twice the PD 205 between a UE 115 and the base station 105-*a*). In some examples, the base station 105-*a* may indicate a TA value in as multiples of transmission samples (e.g., based on a sampling rate, which may depend on the subcarrier spacing (SCS)). In such examples, the base station 105-*a* may transmit this indication of the TA value using a medium access control-control element (MAC-CE) in a physical downlink control channel (PDSCH). After receiving the TA value, the UE 115 may apply the TA value by delaying or advancing its uplink transmission. The TA value may be applied to uplink transmissions following reception of the TA command in the PDSCH. In some examples, the UEs 115 may acquire an additional offset value (e.g., TA offset 225) in addition to the TA value. The TA offset 225 value may be configured by the network and may depend on the frequency band used for wireless communications and the network capability for coexistence between 5G-NR and LTE communications.

If a UE 115 is configured with two uplink carriers (e.g., a first uplink carrier and a supplementary uplink (SUL) carrier), a same TA offset 225 value may apply to both carriers. If a UE 115 has multiple active uplink bandwidth parts (BWPs) in a same timing advanced group (TAG), including uplink BWPs in two uplink carriers of a serving cell, the TA command value may be relative to the largest SCS of the multiple active uplink BWPs. The applicable TA value for an uplink BWP with the lower SCS may be rounded to align with the TA granularity for the uplink BWP with the higher SCS while satisfying the TA accuracy conditions of the network.

As illustrated in FIG. 2B, the base station 105-*a*, the UE 115-*a*, and the UE 115-*b* may operate in accordance with TA principles disclosed herein. In the example of the transmission timeline 220, the base station 105-*a* may operate in accordance with a full-duplex mode and the UE 115-*a* and the UE 115-*b* may operate in accordance with a half-duplex mode. As such, transmission of the uplink message 210-*a* and the uplink message 210-*b* may be shifted with respect to their respective PD 205-*a* and PD 205-*b* such that the uplink message 210-*a* and the uplink message 210-*b* may be aligned on concurrent time resources upon reception at the base station 105-*a* to mitigate inter-channel interference. In some examples, the base station 105-*a* may schedule transmission of the downlink message 215-*a* and 215-*b* for a duration of time after receiving the respective uplink messages 210-*a* and 210-*b* that may be equal to the TA offset 225. In some examples, the UE 115-*a* may receive the downlink message 215-*a* after an additional duration of time equal to the PD 205-*a* and the UE 115-*b* may receive the downlink message 215-*b* after an additional duration of time equal to the PD 205-*b*. Based on the TA scheme used by the network devices, the uplink message 210-*a* may be advanced by twice the value of PD 205-*a* plus the TA offset 225 compared to reception of the downlink message 215-*a* at the UE 115-*a* and the uplink message 210-*b* may advance by twice the value of PD 205-*b* plus the TA offset 225 compared to reception of the downlink message 215-*b* at the UE 115-*b*.

In some cases, the transmission timeline 220 may be an example of either a synchronous timeline of an asynchronous timeline. For example, the transmission timeline 220 may be an example of a synchronous timeline if the TA offset 225 between reception of an uplink message 210 (e.g., the uplink message 210-*a*) and transmission of a corresponding downlink message 215 (e.g., the downlink message 215-*a*) is less than the cyclic prefix (CP) duration length (e.g., less than or equal to 0.3 times the CP length). Alternatively, the transmission timeline 220 may be an example of an asynchronous timeline if the TA offset 225 is greater than CP duration length. In some cases, the UE 115-*a* or the UE 115-*b* may achieve a reduced EVM for wireless communications when the base station 105-*a* operates in accordance with a full-duplex mode and the UE 115-*a* or the UE 115-*b* operates in accordance with a synchronous transmission timeline 220 where the TA offset 225 is set to zero.

In some cases, however, by setting the TA offset 225 to zero, the time between an uplink transmission and a subsequent downlink reception at a UE 115 may not be sufficient to allow for power-down of the UE 115 uplink transmission chain. For example, a UE 115 may operate in accordance with a transient time period mask which defines transient period(s) for transitioning between transmit ON power symbols which may be used for uplink transmissions and transmit OFF power symbols which may be used for downlink reception. In some examples, a UE 115 may be preconfigured with one or more transient periods and based on the transient period in use, the UE 115 may determine when to start the transient period. For instance, an example transient period reference table may be given by Table 1:

TABLE 1

Transient Period and Respective Transient Period Start

| Transient Period Duration (μs) | Transient Period Start (μs) |
|---|---|
| 2 | [−0.5] |
| 4 | [−1] |
| 7 | [−2] |

Note:
Negative value means the transient period starts before the symbol boundary A UE 115 may signal such a transient period capability to the base station 105-*a* which may indicate the current transient period duration and respective starting point of the transient period. If the UE 115 does not signal a transient period capability, a default transient period value of 10 μs may be applied. As such, the transient time period mask may define the observation period between transmit ON power and transmit OFF power. In some examples, the transmit OFF power measurement period may be defined as a duration of at least one slot excluding transient periods. In some examples, the transmit ON power may be defined as the mean power over one slot excluding transient periods. In some examples, the transient period may occur during the TA offset 225 as to not interfere with the uplink or downlink transmissions. However, if the TA offset 225 is set to zero or approximately zero (e.g., during a synchronous timeline) a UE 115 may be unable to fully transition from transmit ON power to transmit OFF power before receiving a downlink message 215 which may result in interference of the first downlink symbols received from the base station 105-*a*.

As such, the UE 115-*a* and the UE 115-*b* may apply a transient power mitigation scheme to mitigate potential interference to reception of the downlink messages 215 during a transient power duration associated with turning off an uplink transmission chain. In some examples, the UE 115-*a* and the UE 115-*b* may start the transient power duration such that a majority of the transient period occurs during an uplink slot so as to not interfere with reception of a first downlink symbol from a base station 105-*a*. Further discussion of a transient period starting primarily in an uplink slot is described herein, including with reference to FIG. 3A.

In some examples, the base station 105-*a* may configure one or more gap symbols between uplink and downlink transmissions such that the transient period occurs during the gap period so as to not interfere with reception of a first downlink symbol from the base station 105-*a*. In some examples, the base station 105-*a* may consider the priority of the last uplink symbol from the UE 115 when determining whether to configure one or more gap symbols. For instance, if the last uplink symbol has a higher priority than the first downlink symbol, the base station 105-*a* may include a gap symbol. Further discussion of configuring gap symbols between uplink and downlink symbols is described herein, including with reference to FIG. 3B.

In some cases, the UE 115 may operate in accordance with a comb allocation (e.g., comb2 or comb4) in the frequency domain corresponding to multiple uplink repetitions in the time domain. For example, the base station 105-*a* may configure the UE 115 with a virtual increase of SCS in the last uplink symbol of an uplink transmission which may result in a transmission repetition in the time domain. In such cases, the UE 115 may drop the last uplink repetition to initiate the transient period. Further discussion of comb frequency allocation is described herein, including with reference to FIG. 4.

FIGS. 3A and 3B illustrate examples of a transmission timeline 300-*a* and a transmission timeline 300-*b* that support an on-off transient power time mask at a UE supporting full-duplex gNB operation in accordance with aspects of the present disclosure. The transmission timelines 300 may implement or be implemented by one or more aspects of the wireless communications system 100 or wireless communications system 200. For example, the transmission timelines 300 may include a UE 115-*c*, and a base station 105-*b* which may be respective examples of a UE 115 and a base station 105 as described with reference to FIG. 1 and FIGS. 2A and 2B. In some examples, the UE 115-*c* may operate in accordance with a transient power mitigation scheme. Specifically, the UE 115-*c* may operate in accordance with a transient power mitigation scheme in which a majority of a transient power duration occurs during transmission of uplink messages 310 as illustrated in FIG. 3A or may operate in accordance with a transient power mitigation scheme in which one or more gap symbols 320 are scheduled between transmission of uplink messages 310 and reception of downlink messages 315 as illustrated in FIG. 3B.

With reference to FIG. 3A, the transmission timeline 300-*a* may be an example of a synchronous timeline in which an additional TA offset (e.g., with reference to the TA offset 225 in FIG. 2B) is set to zero. The UE 115-*c* may operate in accordance with a half-duplex mode and transmit uplink messages 310-*a* through 310-*b* during a first uplink slot to the base station 105-*b* while operating in a power ON state. In some examples, the uplink messages 310-*a* through 310-*b* may be advanced by some amount of time as illustrated in FIG. 3A. In such examples, the amount of time in which the uplink messages 310 are advanced may be equal to the propagation delay associated with the wireless communications (e.g., with reference to PD 205 in FIGS. 2A and 2B).

In some examples, the base station 105-*b* may operate in accordance with a full-duplex mode. For instance, while receiving the uplink messages 310-*a* through 310-*b* from the UE 115-*c*, the base station 105-*b* may concurrently transmit downlink messages 315-*a* through 315-*b* to a secondary UE 115 (not illustrated in FIG. 3A). Based on receiving the uplink messages 310-*a* through 310-*b*, the base station 105-*b* may schedule a downlink transmission (e.g., including a downlink message 315-*c*) for transmission to the UE 115-*c*. However, due to the base station 105-*b* and the UE 115-*c* operating in accordance with a synchronous timeline, the UE 115-*c* may receive the downlink message 315-*c* before the UE 115-*c* can fully transition from the power ON state to the power OFF state which may result in interference of the first downlink symbols of the downlink message 315-*c*.

As such, the UE 115-*c* may operate in accordance with a transient power mitigation scheme in which majority of the transient power 305 duration (e.g., transient period) occurs during transmission of the uplink messages 310. For example, as illustrated in FIG. 3A, the UE 115-*c* may start the transient period during the last one or more symbols of the uplink message 310-*b*. In some cases, this may allow the UE 115-*c* to mitigate interference while receiving the downlink message 315-*c*. In some examples, the UE 115-*c* may determine when to start the transient period based on a transient period duration. For example, the UE 115-*c* may operate in accordance with a preconfigured table that may indicate multiple transient periods and associated start values. For instance, an example transient period and respective transient period start values may be given by Table 2:

TABLE 2

Transient Period Duration and Respective Transient Period Start

| Transient Period Duration (µs) | Transient Period Start (µs) |
| --- | --- |
| 2 | <−1 |
| 4 | <−2 |
| 7 | <−3.5 |
| 10 | <−5 |

Note:
Negative value means the transient period starts before the symbol boundary As denoted in Table 2, the transient period start values (e.g., Tp_start) may be greater than half of the associated transient power 305 duration (e.g., Tp) and start in the last symbol of the uplink slot (e.g., Tp_start<−0.5 Tp) such that the transient period may start and end within the last uplink symbol. In some examples, the UE 115-*c* may be preconfigured with a table that may indicate multiple transient period durations and an associated range of start values. For instance, an example transient period duration with a range of associated start values may be given by Table 3:

TABLE 3

Transient Period Duration and Respective Transient Period Start Range

| Transient Period Duration (µs) | Transient Period Start (µs) |
| --- | --- |
| 2 | −1.5 < Tp_start < −0.5 |
| 4 | −3 < Tp_start < −1 |

TABLE 3-continued

Transient Period Duration and Respective Transient Period Start Range

| Transient Period Duration (µs) | Transient Period Start (µs) |
| --- | --- |
| 7 | −6 < Tp_start < −1 |
| 10 | −9 < Tp_start < −1 |

Note:
Negative value means the transient period starts before the symbol boundary As denoted in Table 3, each transient period duration may have an associated range of transient period start values. In some examples, the UE 115-*c* may pick a value from the range based on pre-defined rules that considers the priority of last uplink symbol and first downlink symbol. In some examples, the UE 115-*c* may perform an autonomous selection of a transient period start value by considering priority of channels. In some examples, the base station 105-*b* may configure the UE 115-*c* with a specific transient start period value via an RRC configuration message.

With reference to FIG. 3B, the UE 115-*c* may operate in accordance with a transient power mitigation scheme in which the base station 105-*b* configures a number of gap symbols 320 between transmission of the uplink messages 310 and reception of downlink messages 315 at the UE 115-*c*. In some examples, the transmission timeline 300-*b* may also be an example of a synchronous timeline, and the uplink messages 310-*a* through 310-*b* may be advanced by some amount of time as illustrated in FIG. 3A. In such examples, the amount of time in which the uplink messages 310 are advanced may be equal to the propagation delay associated with the uplink transmission (e.g., with reference to PD 205 in FIGS. 2A and 2B).

In some examples, the base station 105-*b* may also operate in accordance with a full-duplex mode and receive the uplink messages 310-*a* through 310-*b* from the UE 115-*c* during a first uplink slot while concurrently transmitting downlink messages 315-*a* through 315-*b* to a secondary UE 115-*c* 115 (not illustrated in FIG. 3B). Based on receiving the uplink messages 310-*a* through 310-*b* and operating in accordance with a synchronous timeline, the base station 105-*b* may schedule one or more gap symbols 320 during which the UE 115-*c* may turn off the uplink transmission chain and prepare to receive one or more downlink transmissions (e.g., a downlink message 315-*d*) from the base station 105-*b* during a downlink slot. In some cases, the one or more gap symbols 320 may be scheduled for the UE 115-*c* and not the base station 105-*b*. For instance, the base station 105-*b* may concurrently transmit a downlink message 215-*c* to the secondary UE 115 while scheduling the one or more gap symbols 320 in accordance with use of the full-duplex mode.

In some examples, the base station 105-*b* may configure the number of gap symbols 320 based on the active BWP SCS when the UE 115-*c* is switching from transmitting uplink messages 310 to receiving downlink messages 315. For instance, as the SCS increases the symbol length proportionally decreases, and as such the base station 105-*b* may schedule more gap symbols 320 to ensure the UE 115-*c* has enough time to complete the transient period duration before receiving the downlink message 315-*d* from the base station 105-*b*. As illustrated in FIG. 3B, the gap symbol 320 is scheduled in the first symbol of the downlink slot. In some cases, however, the gap symbol 320 may be scheduled in the last symbol of the uplink slot (e.g., in place of the uplink message 310-*b*).

In some cases, the base station 105-*b* may consider the priority of the last symbol of the uplink slot when determining whether to introduce one or more gap symbols 320 or rely on the UE 115-*c* to include a transient period in the last uplink symbol of the uplink slot. For example, the base station 105-*b* may refrain from scheduling gap symbols 320 and allow the UE 115-*c* to absorb the transient period within the last uplink symbol (e.g., the uplink message 310-*b*) if the last uplink symbol has a low priority (e.g., a physical uplink shared channel (PUSCH) with no uplink control information (UCI)). If, however, the last symbol has a higher priority (e.g., an acknowledgment (ACK) or non-ACK (NACK) message on a physical uplink control channel (PUCCH)), the base station 105-*b* may schedule the one or more gap symbols 320 at either the end of the uplink slot or at the beginning of the downlink slot. For example, the UE 115-*c* is not expected to transmit a PUCCH and receive a physical downlink control channel (PDCCH) in adjacent symbols. If the base station 105-*b* determines to configure one or more gap symbols 320 in the uplink slot, the base station 105-*b* may transmit to the UE 115-*c* a gap symbol 320 indication or an uplink symbol cancellation (e.g., cancelling uplink message 310-*b*) so the UE 115-*c* may apply a time mask within the last uplink symbol. In some examples, determining to use gap symbols 320 or a transient period in the last uplink symbol may depend on the uplink and downlink channels in use. For example, if the last uplink channel is a PUCCH and the first downlink channel is PDCCH, the base station 105-*b* may schedule gap symbols 320 such that the PUCCH and PDCCH are not in adjacent symbols. If the last uplink channel is a PUSCH and the first downlink channel is a PDCCH, the UE 115-*c* may absorb the transient period into the last uplink symbol or drop the last symbol of the PUSCH.

As such, the base station 105-*b* and UE 115-*c* 115 may determine whether to operate in accordance with the transient power mitigation scheme of FIG. 3A or FIG. 3B based on a set of priority rules applied to the last uplink symbol and the first downlink symbol. For example, priority rules may be applied to time-domain behaviors (e.g., aperiodic (AP) signaling, semi-periodic (SP) signaling, and periodic (P) signaling), channel type (PUSCH, PUCCH, sounding reference signal (SRS), etc.), message contents (uplink shared channel (SCH), UCI, control state information (CSI), SRS, etc.), or a combination thereof. For example, between an AP/SP/P SRS and a PDCCH, the PDCCH may have a higher priority and between an AP SRS and an SP PDSCH, the AP SRS may have a higher priority.

Figure 4:
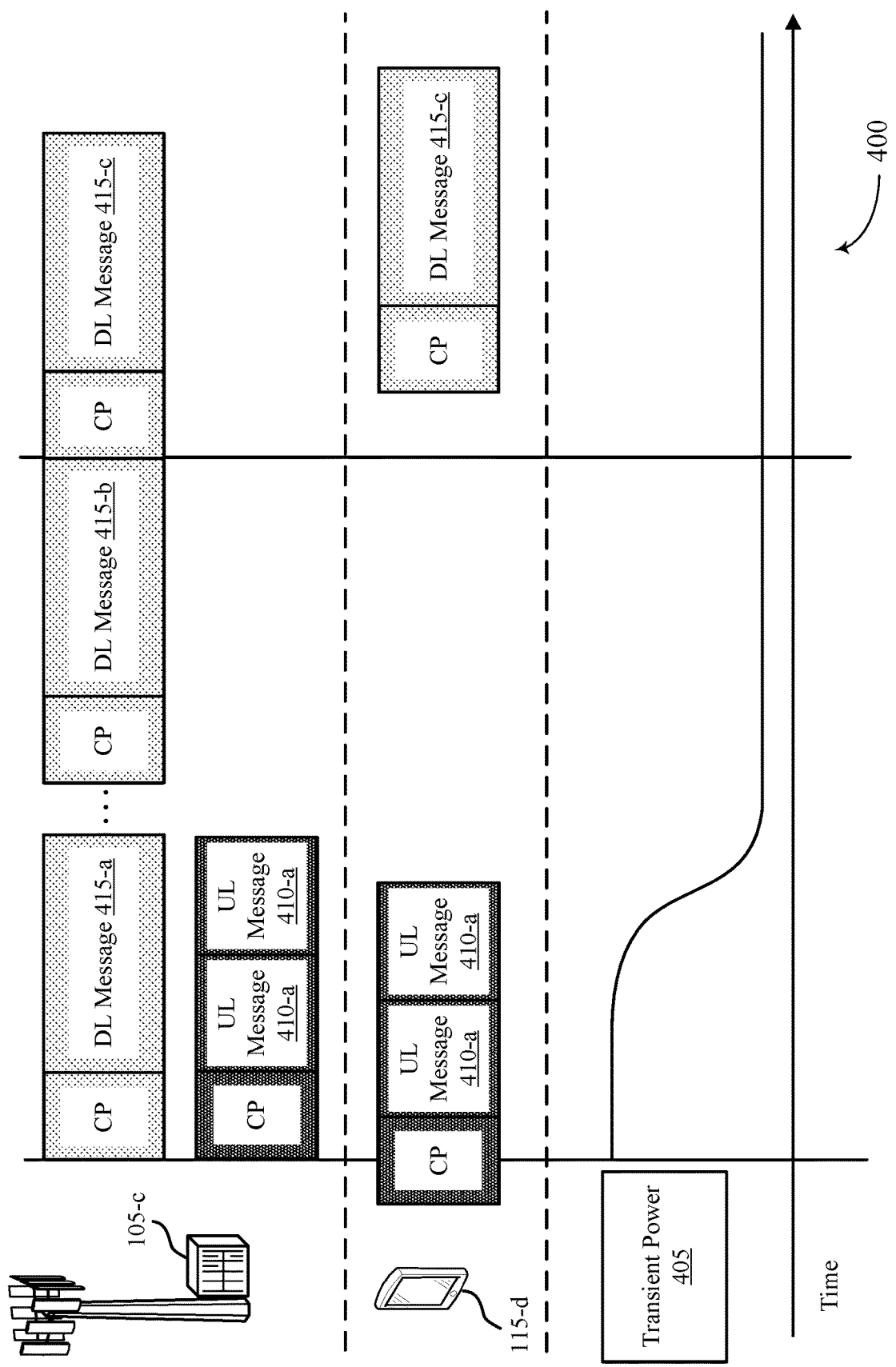
FIG. 4 illustrates an example of a transmission timeline that supports an on-off transient power time mask at a UE supporting full-duplex gNB operation in accordance with aspects of the present disclosure.

FIG. 4 illustrates an example of a transmission timeline 400 that supports an on-off transient power time mask at a UE supporting full-duplex gNB operation in accordance with aspects of the present disclosure. The transmission timeline 400 may implement or be implemented by one or more aspects of the wireless communications system 100 or wireless communications system 200. For example, the transmission timeline 400 may include a UE 115-*d*, and a base station 105-*c* which may be respective examples of a UE 115 and a base station 105 as described with reference to FIG. 1 and FIGS. 2A and 2B. In some examples, the UE 115-*d* may receive an indication of a virtual SCS increase for a last symbol of an uplink slot and configure the virtual SCS increase using a comb frequency resulting in a repetition of uplink messages 410 in the time domain while retaining the duration of the uplink symbol. As such the UE 115-*d* may determine to drop or mask one or more time domain repetitions such that a majority of a transient power 405 duration may occur during the uplink slot.

With reference to FIG. 4, the transmission timeline 400 may be an example of a synchronous timeline in which an additional TA offset (e.g., with reference to the TA offset 225 in FIG. 2B) is set to zero. As such, the UE 115-*d* may operate in accordance with a half-duplex mode and transmit uplink messages 410 during a first uplink slot to the base station 105-*c* while operating in a power ON state. In some examples, the uplink messages 410 may be advanced by some amount of time as illustrated in FIG. 4. In such examples, the amount of time in which the uplink messages 410 are advanced may be equal to the propagation delay associated with the wireless communications (e.g., with reference to PD 205 in FIGS. 2A and 2B).

In some examples, the base station 105-*c* may operate in accordance with a full-duplex mode. For instance, while receiving the uplink messages 410 from the UE 115-*d*, the base station 105-*c* may concurrently transmit downlink messages 415-*a* through 415-*b* to a secondary UE 115 (not illustrated in FIG. 4). In some examples, the base station 105-*c* may transmit to the UE 115-*d* an indication for a virtual SCS increase for a last symbol of the uplink slot. As such, the UE 115-*d* may operate in accordance with the virtual SCS increase using a comb frequency allocation which may correspond to one or more time domain repetitions. For instance, as illustrated in FIG. 4, the UE 115-*d* is using a comb2 allocation in the frequency domain which corresponds to two repetitions in the time domain (e.g., two repetitions of uplink message 410-*a*). While FIG. 4 illustrates a comb2 allocation, a person skilled in the art would appreciate that the UE 115-*d* may operate in accordance with other comb allocations (e.g., comb 4, etc.).

In cases in which the transmission timeline 400 is an example of a synchronous timeline, the UE 115-*d* may determine to drop, or mask one or more instances of time domain repetitions (e.g., one or more repetitions of the uplink message 410-*a*) such that majority of the transient power 405 duration may occur before reception of downlink transmissions from the base station 105-*c* (e.g., a downlink message 415-*c*). This may correspond to dropping or masking one half or one quarter of the last symbol in the uplink slot depending on if the UE 115-*d* is operating in accordance with comb2 or a comb4 allocation respectively. In some examples, the base station 105-*d* may configure the UE (e.g., via RRC signaling) with an SRS comb2 or comb4 allocation and indicate for the UE 115-*d* to drop the last repetition. In some examples, the configuration may also allocate uplink data to a pattern of frequency tones based on the comb frequency allocation. For example, if the allocation is of comb2 the uplink data may be scheduled to one of all even tones or all odd tones and if the allocation is of comb4 the uplink data may be scheduled every four tones. In some examples, the configuration may also allocate the uplink slot with demodulated reference signal (DMRS) symbols without frequency division multiplexing (FDM) data in the last uplink symbol.

Figure 5:
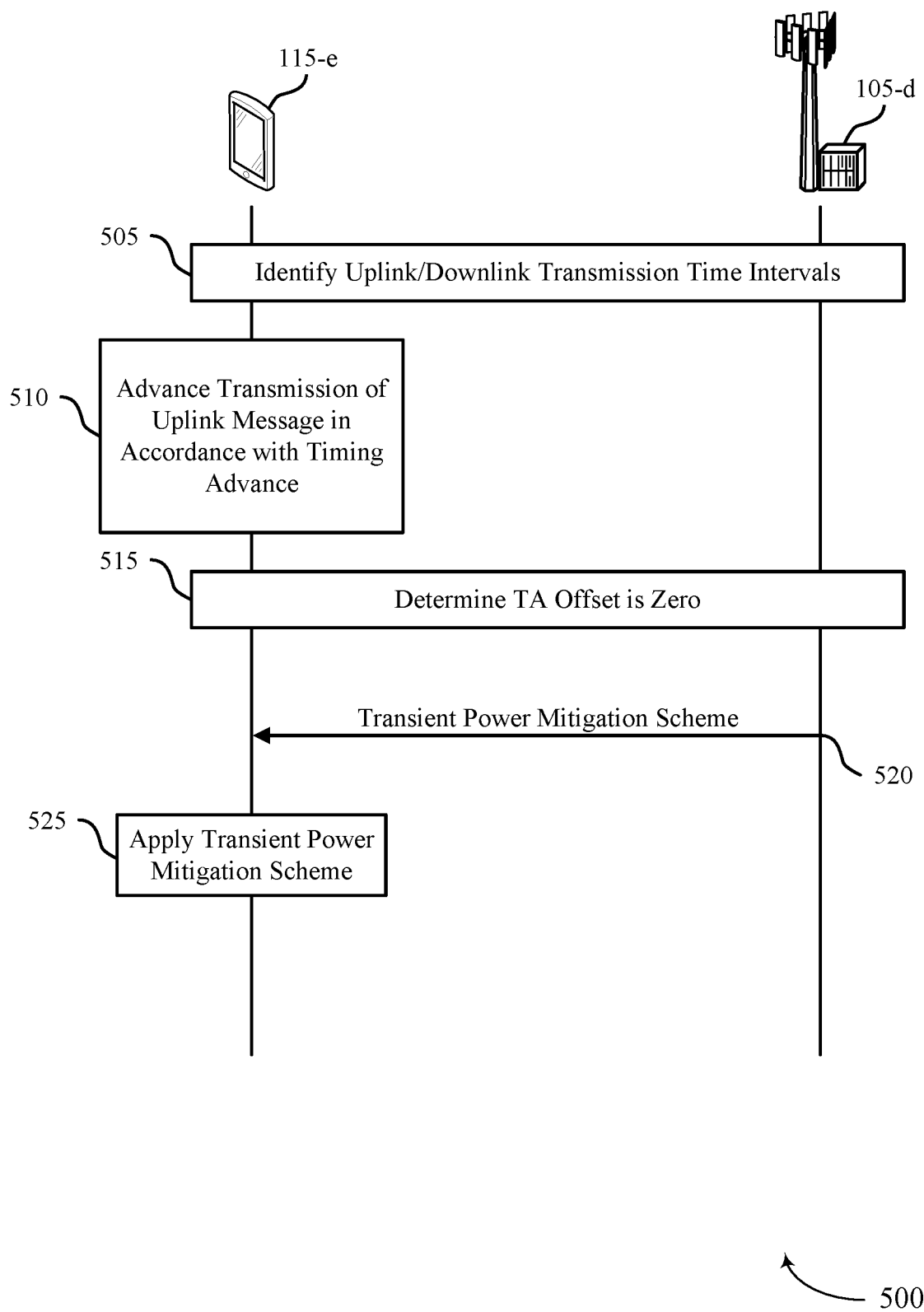
FIG. 5 illustrates an example of a process flow that supports an on-off transient power time mask at a UE supporting full-duplex gNB operation in accordance with aspects of the present disclosure.

FIG. 5 illustrates an example of a process flow 500 that supports an on-off transient power time mask at a UE supporting full-duplex gNB operation in accordance with aspects of the present disclosure. In some examples, process flow 500 may implement aspects of wireless communications system 100, wireless communications system 200, or a combination thereof. Process flow 500 includes a UE 115-*e* and a base station 105-*d*, which may be respective examples of a UE 115-*e* 115 and a base station 105-*d* 105 as described with reference to FIGS. 1 and 2. Alternative examples of the following may be implemented, where some steps are performed in a different order than described or are not performed at all. In some cases, steps may include additional features not mentioned below, or further steps may be added. In addition, while process flow 500 shows processes between a single base station 105-*d* and UE 115-*e*, it should be understood that these processes may occur between any number of network devices.

At 505, the UE 115-*e* and the base station 105-*d* may both identify that the UE 115-*e* may be scheduled to transmit an uplink message during one or more symbols of a first TTI and that the UE 115-*e* is scheduled to receive a downlink message from the base station 105-*d* during a second TTI subsequent to the first TTI. In some examples, the base station 105-*d* may operate in accordance with full-duplex mode and the UE 115-*e* may operate in accordance with a half-duplex mode during the first and second TTIs.

At 510, the UE 115-*e* may advance transmission of the uplink message in accordance with a TA value and a TA offset value. In some examples, the TA offset value is zero or is within a threshold range of zero such that the UE 115-*e* and the base station 105-*d* are communicating using a synchronous timeline.

At 515, the UE 115-*e* and the base station 105-*d* may determine that the TA offset value is set equal to zero. In some examples, the base station 105-*d* and the UE 115-*e* may also determine that a combination of the TA value and the TA offset value is less than the transient power duration.

At 520, the base station 105-*d* may transmit to the UE 115-*e* an indication of an applied transient power mitigation scheme to be applied by the UE 115-*e* based on the TA offset being zero or within the threshold range of zero. For example, the applied transient power mitigation scheme may be used to mitigate potential interference to reception of the downlink message, at the UE 115-*e*, during a transient power duration associated with the UE 115-*e* turning off an uplink transmission chain used for transmitting the uplink message. In some examples, applying the transient power mitigation scheme may be further based on the combination of the TA value and the TA offset value being less than the transient power duration At 525, the UE 115-*e* may apply the transient power mitigation scheme to mitigate potential interference to reception of the downlink message during the transient power duration. In some examples, the UE 115-*e* may select the transient power mitigation scheme from a set of schemes. For example, a first scheme may include starting the transient power duration such that a majority of the transient power duration occurs in the first TTI, and a second scheme may include insertion of a number of gap symbols between the transmission of the uplink message and the reception of the downlink message.

In some examples, the UE 115-*e* may determine to use either the first scheme or the second scheme based on a priority of a last symbol of the first TTI. For example, the UE 115-*e* may use the second scheme based on the priority of the last symbol of the first TTI being above a threshold, such that the second scheme includes the insertion of a gap symbol during one or more initial symbols of the second TTI. Alternatively, the UE 115-*e* may use the first scheme based on the priority of the last symbol of the first TTI being below the threshold. Based on which scheme is selected, the UE 115-*e* may receive, from the base station 105-*d*, a gap symbol indication or an indication to apply a time mask within the last symbol of the first TTI. In some examples, the UE 115-*e* may use the second scheme based on the priority of the last symbol of the first TTI and the gap symbol indication or the indication to apply the time mask within the last symbol of the first TTI. The UE 115-*e* and base station 105-*d* may determine the priority of the last symbol of the first TTI based on whether the uplink message is aperiodic, semi-persistent, or periodic, on a channel type associated with the uplink message, on a content of the uplink message, on a pair of channel types associated with the uplink message and the downlink message, on the content of the uplink message and a content of the downlink message, or a combination thereof.

In some examples, the UE 115-*e* may start the transient power duration during a last symbol of the first TTI such that a majority of the transient power duration occurs in the first TTI. For example, the UE 115-*e* may determine the transient power duration and an associated start value for the transient power duration based on a transient period start table configured at the UE 115-*e*, such that the transient period start table includes a set of one or more transient power durations and associated start values. In some examples, each transient power duration of the set of one or more transient power durations may be associated with a range of start values. In such examples, the UE 115-*e* may select a start value from the range of start values based on a priority of the last symbol of the first TTI and a priority of a first symbol of the second TTI, a priority of channels associated with the uplink message and the downlink message, receiving an RRC message indicating the start value, or a combination thereof.

In some examples, the UE 115-*e* may apply a number of gap symbols between the transmission of the uplink message and the reception of the downlink message. The UE 115-*e* may determine the number of gap symbols based on a BWP SCS associated with the UE 115-*e* while transitioning from the first TTI to the second TTI. The UE 115-*e* may also determine to place the number of gap symbols at an end of the first TTI or at a start of the second TTI based on a priority of the uplink message and a priority of the downlink message.

In some examples, the UE 115-*e* may receive, from the base station 105-*d*, an indication for a virtual SCS increase for a last symbol of the first TTI, and may configure the virtual SCS increase using a comb frequency allocation corresponding to one or more time domain repetitions. The UE 115-*e* may determine to drop or mask one or more of the one or more time domain repetitions such that the uplink message is allocated to a pattern of frequency tones based on the comb frequency allocation. The comb frequency allocation may be one of all even tones within a comb or all odd tones within the comb, and the uplink message may include a DMRS during the last symbol of the first TTI.

Figure 6:
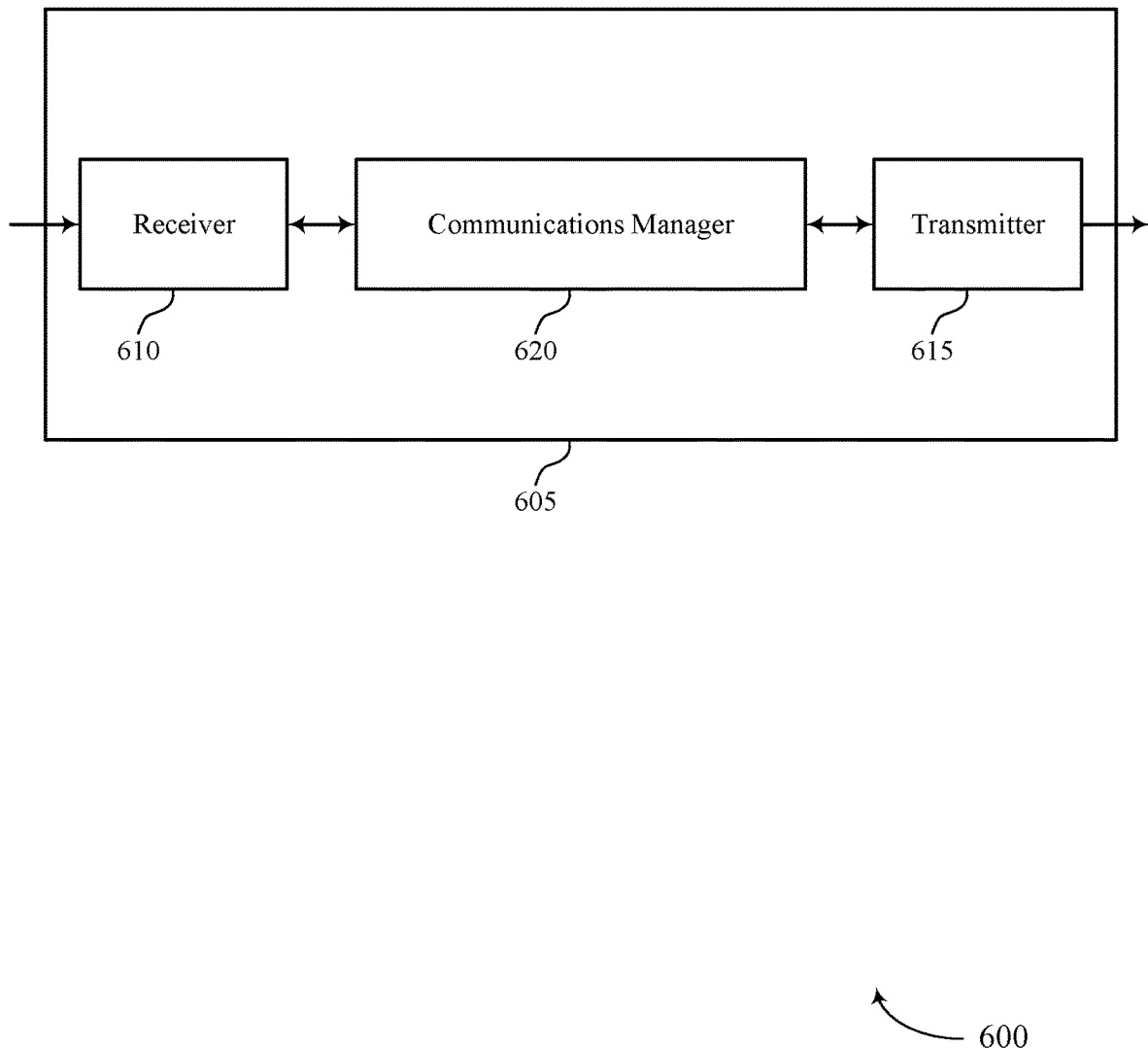
FIGS. 6 and 7 show block diagrams of devices that support an on-off transient power time mask at a UE supporting full-duplex gNB operation in accordance with aspects of the present disclosure.

FIG. 6 shows a block diagram 600 of a device 605 that supports an on-off transient power time mask at a UE supporting full-duplex gNB operation in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to an on-off transient power time mask at a UE supporting full-duplex gNB operation). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to an on-off transient power time mask at a UE supporting full-duplex gNB operation). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of an on-off transient power time mask at a UE supporting full-duplex gNB operation as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for identifying that the UE is scheduled to transmit an uplink message during one or more symbols of a first transmission time interval and that the UE is scheduled to receive a downlink message during a second transmission time interval subsequent to the first transmission time interval. The communications manager 620 may be configured as or otherwise support a means for advancing transmission of the uplink message in accordance with a timing advance value and a timing advance offset value, where the timing advance offset value is zero or is within a threshold range of zero. The communications manager 620 may be configured as or otherwise support a means for applying a transient power mitigation scheme to mitigate potential interference to reception of the downlink message during a transient power duration associated with turning off an uplink transmission chain used for transmitting the uplink message, the transient power mitigation scheme being applied based on the timing advance offset value being zero or within the threshold range of zero.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for mitigating interference upon reception of downlink transmissions from a secondary network device. This interference mitigating may increase communication efficiency, decrease power consumption, decrease signaling overhead, and increase signaling performance.

Figure 7:
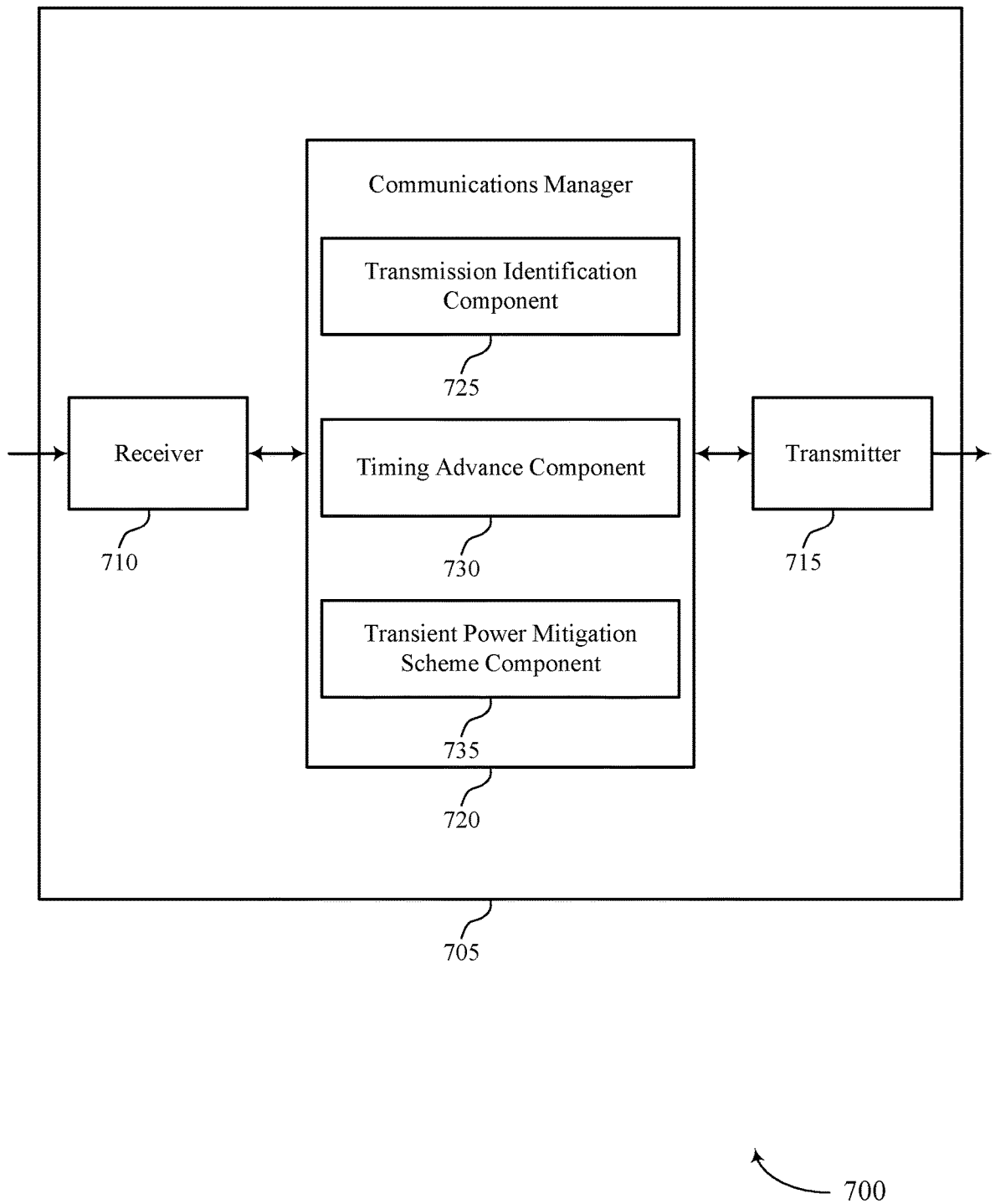

FIG. 7 shows a block diagram 700 of a device 705 that supports an on-off transient power time mask at a UE supporting full-duplex gNB operation in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to an on-off transient power time mask at a UE supporting full-duplex gNB operation). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to an on-off transient power time mask at a UE supporting full-duplex gNB operation). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of an on-off transient power time mask at a UE supporting full-duplex gNB operation as described herein. For example, the communications manager 720 may include a transmission identification component 725, a timing advance component 730, a transient power mitigation scheme component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The transmission identification component 725 may be configured as or otherwise support a means for identifying that the UE is scheduled to transmit an uplink message during one or more symbols of a first transmission time interval and that the UE is scheduled to receive a downlink message during a second transmission time interval subsequent to the first transmission time interval. The timing advance component 730 may be configured as or otherwise support a means for advancing transmission of the uplink message in accordance with a timing advance value and a timing advance offset value, where the timing advance offset value is zero or is within a threshold range of zero. The transient power mitigation scheme component 735 may be configured as or otherwise support a means for applying a transient power mitigation scheme to mitigate potential interference to reception of the downlink message during a transient power duration associated with turning off an uplink transmission chain used for transmitting the uplink message, the transient power mitigation scheme being applied based on the timing advance offset value being zero or within the threshold range of zero.

Figure 8:
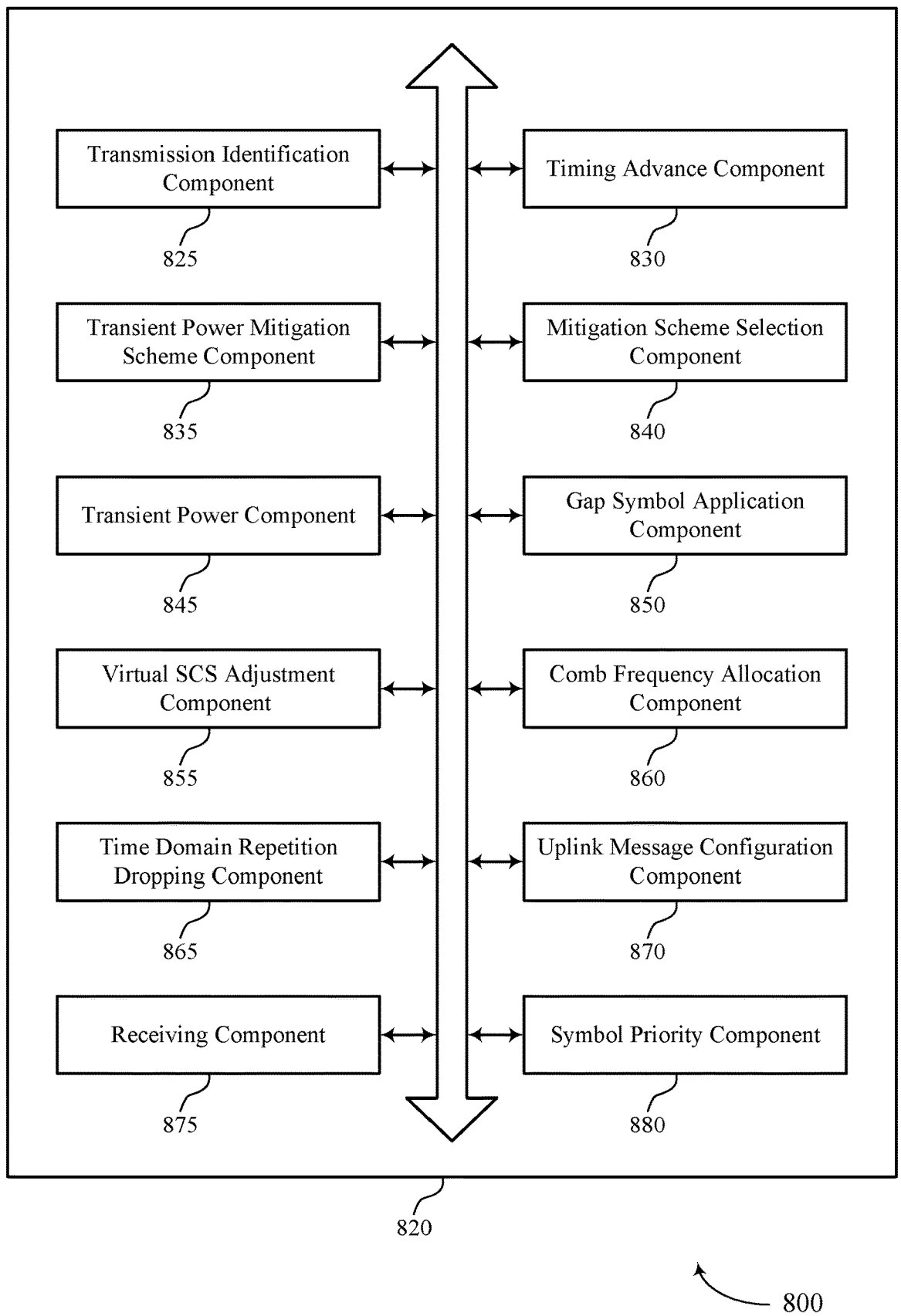
FIG. 8 shows a block diagram of a communications manager that supports an on-off transient power time mask at a UE supporting full-duplex gNB operation in accordance with aspects of the present disclosure.

FIG. 8 shows a block diagram 800 of a communications manager 820 that supports an on-off transient power time mask at a UE supporting full-duplex gNB operation in accordance with aspects of the present disclosure. The communications manager 820 may be an example of aspects of a communications manager 620, a communications manager 720, or both, as described herein. The communications manager 820, or various components thereof, may be an example of means for performing various aspects of an on-off transient power time mask at a UE supporting full-duplex gNB operation as described herein. For example, the communications manager 820 may include a transmission identification component 825, a timing advance component 830, a transient power mitigation scheme component 835, a mitigation scheme selection component 840, a transient power component 845, a gap symbol application component 850, a virtual SCS adjustment component 855, a comb frequency allocation component 860, a time domain repetition dropping component 865, an uplink message configuration component 870, a receiving component 875, a symbol priority component 880, or any combination thereof. Each of these components may communicate, directly or indirectly, with one another (e.g., via one or more buses).

The communications manager 820 may support wireless communication at a UE in accordance with examples as disclosed herein. The transmission identification component 825 may be configured as or otherwise support a means for identifying that the UE is scheduled to transmit an uplink message during one or more symbols of a first transmission time interval and that the UE is scheduled to receive a downlink message during a second transmission time interval subsequent to the first transmission time interval. The timing advance component 830 may be configured as or otherwise support a means for advancing transmission of the uplink message in accordance with a timing advance value and a timing advance offset value, where the timing advance offset value is zero or is within a threshold range of zero. The transient power mitigation scheme component 835 may be configured as or otherwise support a means for applying a transient power mitigation scheme to mitigate potential interference to reception of the downlink message during a transient power duration associated with turning off an uplink transmission chain used for transmitting the uplink message, the transient power mitigation scheme being applied based on the timing advance offset value being zero or within the threshold range of zero.

In some examples, the timing advance component 830 may be configured as or otherwise support a means for determining that a combination of the timing advance value and the timing advance offset value is less than the transient power duration, where applying the transient power mitigation scheme is further based on the combination of the timing advance value and the timing advance offset value being less than the transient power duration.

In some examples, to support applying the transient power mitigation scheme, the mitigation scheme selection component 840 may be configured as or otherwise support a means for selecting from a set of multiple schemes, where a first scheme includes starting the transient power duration such that a majority of the transient power duration occurs in the first transmission time interval, and a second scheme includes insertion of a number of gap symbols between the transmission of the uplink message and the reception of the downlink message.

In some examples, to support selecting from the set of multiple schemes, the mitigation scheme selection component 840 may be configured as or otherwise support a means for determining to use either the first scheme or the second scheme based on a priority of a last symbol of the first transmission time interval.

In some examples, to support determining to use either the first scheme or the second scheme, the mitigation scheme selection component 840 may be configured as or otherwise support a means for using the second scheme based on the priority of the last symbol of the first transmission time interval being above a threshold, where the second scheme includes the insertion of a gap symbol during one or more initial symbols of the second transmission time interval.

In some examples, to support determining to use either the first scheme or the second scheme, the mitigation scheme selection component 840 may be configured as or otherwise support a means for using the first scheme based on the priority of the last symbol of the first transmission time interval being below a threshold.

In some examples, to support determining to use either the first scheme or the second scheme, the receiving component 875 may be configured as or otherwise support a means for receiving, at the UE, a gap symbol indication or an indication to apply a time mask within the last symbol of the first transmission time interval. In some examples, to support determining to use either the first scheme or the second scheme, the mitigation scheme selection component 840 may be configured as or otherwise support a means for using the second scheme based on the priority of the last symbol of the first transmission time interval and the gap symbol indication or the indication to apply the time mask within the last symbol of the first transmission time interval.

In some examples, the symbol priority component 880 may be configured as or otherwise support a means for determining the priority of the last symbol of the first transmission time interval based on whether the uplink message is aperiodic, semi-persistent, or periodic, on a channel type associated with the uplink message, on a content of the uplink message, on a pair of channel types associated with the uplink message and the downlink message, on the content of the uplink message and a content of the downlink message, or a combination thereof.

In some examples, to support applying the transient power mitigation scheme, the transient power component 845 may be configured as or otherwise support a means for starting the transient power duration during a last symbol of the first transmission time interval such that a majority of the transient power duration occurs in the first transmission time interval.

In some examples, the transient power component 845 may be configured as or otherwise support a means for determining the transient power duration and an associated start value for the transient power duration based on a transient period start table configured at the UE, where the transient period start table includes a set of one or more transient power durations and associated start values.

In some examples, each transient power duration of the set of one or more transient power durations is associated with a range of start values.

In some examples, the transient power component 845 may be configured as or otherwise support a means for selecting a start value from the range of start values based on a priority of the last symbol of the first transmission time interval and a priority of a first symbol of the second transmission time interval, a priority of channels associated with the uplink message and the downlink message, receiving a radio resource control message indicating the start value, or a combination thereof.

In some examples, to support applying the transient power mitigation scheme, the gap symbol application component 850 may be configured as or otherwise support a means for applying a number of gap symbols between the transmission of the uplink message and the reception of the downlink message.

In some examples, the gap symbol application component 850 may be configured as or otherwise support a means for determining the number of gap symbols based on a bandwidth part subcarrier spacing associated with the UE while transitioning from the first transmission time interval to the second transmission time interval.

In some examples, the gap symbol application component 850 may be configured as or otherwise support a means for determining to place the number of gap symbols at an end of the first transmission time interval or at a start of the second transmission time interval based on a priority of the uplink message and a priority of the downlink message.

In some examples, the virtual SCS adjustment component 855 may be configured as or otherwise support a means for receiving an indication for a virtual subcarrier spacing increase for a last symbol of the first transmission time interval. In some examples, the comb frequency allocation component 860 may be configured as or otherwise support a means for configuring the virtual subcarrier spacing increase using a comb frequency allocation corresponding to one or more time domain repetitions.

In some examples, the time domain repetition dropping component 865 may be configured as or otherwise support a means for determining to drop one or more of the one or more time domain repetitions, where the uplink message is allocated to a pattern of frequency tones based on the comb frequency allocation.

In some examples, the comb frequency allocation is one of all even tones within a comb or all odd tones within the comb. In some examples, the uplink message includes a demodulation reference signal during the last symbol of the first transmission time interval.

Figure 9:
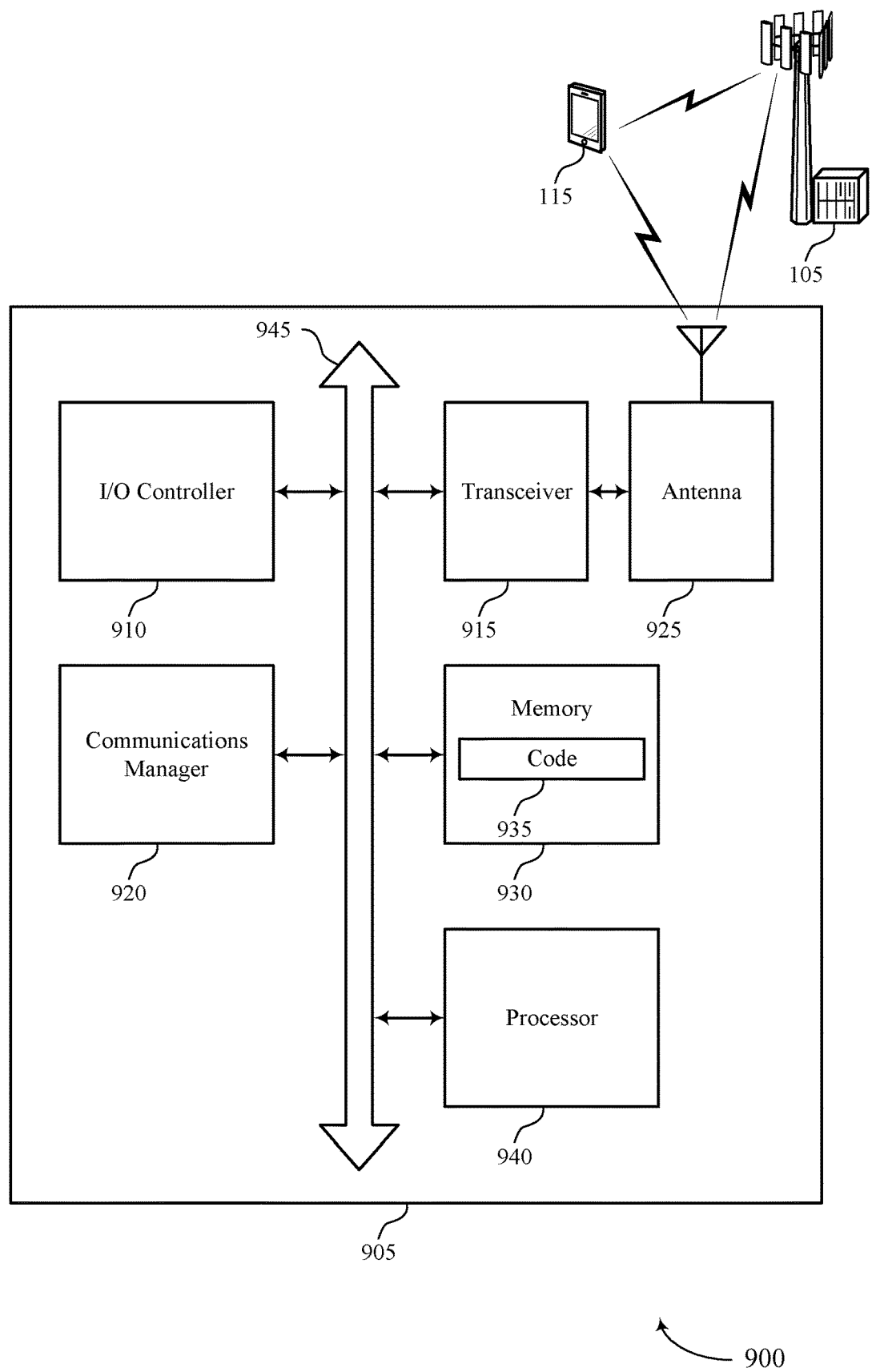
FIG. 9 shows a diagram of a system including a device that supports an on-off transient power time mask at a UE supporting full-duplex gNB operation in accordance with aspects of the present disclosure.

FIG. 9 shows a diagram of a system 900 including a device 905 that supports an on-off transient power time mask at a UE supporting full-duplex gNB operation in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting an on-off transient power time mask at a UE supporting full-duplex gNB operation). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for identifying that the UE is scheduled to transmit an uplink message during one or more symbols of a first transmission time interval and that the UE is scheduled to receive a downlink message during a second transmission time interval subsequent to the first transmission time interval. The communications manager 920 may be configured as or otherwise support a means for advancing transmission of the uplink message in accordance with a timing advance value and a timing advance offset value, where the timing advance offset value is zero or is within a threshold range of zero. The communications manager 920 may be configured as or otherwise support a means for applying a transient power mitigation scheme to mitigate potential interference to reception of the downlink message during a transient power duration associated with turning off an uplink transmission chain used for transmitting the uplink message, the transient power mitigation scheme being applied based on the timing advance offset value being zero or within the threshold range of zero.

By including or configuring the communications manager 920 in accordance with examples as described herein, the device 905 may support techniques for mitigating interference upon reception of downlink transmissions from a secondary network device. This interference mitigation may improve communication reliability, reduce latency, decrease power consumption, decrease signaling overhead, increase signaling performance, and result in more efficient utilization of communication resources.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of an on-off transient power time mask at a UE supporting full-duplex gNB operation as described herein, or the processor 940 and the memory 930 may be otherwise configured to perform or support such operations.

Figure 10:
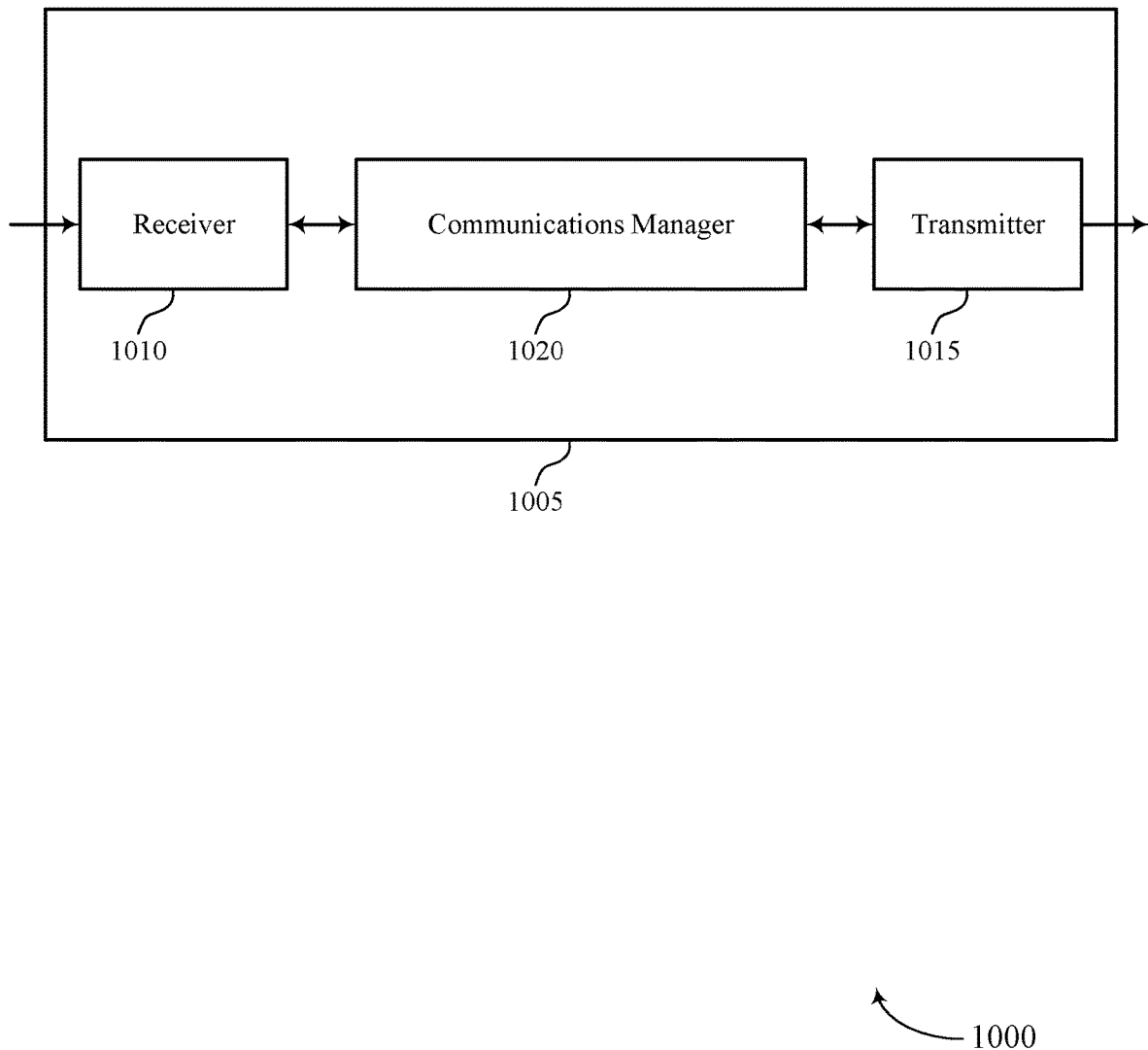
FIGS. 10 and 11 show block diagrams of devices that support an on-off transient power time mask at a UE supporting full-duplex gNB operation in accordance with aspects of the present disclosure.

FIG. 10 shows a block diagram 1000 of a device 1005 that supports an on-off transient power time mask at a UE supporting full-duplex gNB operation in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to an on-off transient power time mask at a UE supporting full-duplex gNB operation). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to an on-off transient power time mask at a UE supporting full-duplex gNB operation). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of an on-off transient power time mask at a UE supporting full-duplex gNB operation as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. For example, the communications manager 1020 may be configured as or otherwise support a means for identifying that a UE is scheduled to transmit an uplink message during one or more symbols of a first transmission time interval and that the UE is scheduled to receive a downlink message during a second transmission time interval subsequent to the first transmission time interval, where receipt of the uplink message is to be in accordance with a timing advance value and a timing advance offset value, and where the base station is operating in a full-duplex mode during one or more of the first transmission time interval and the second transmission time interval. The communications manager 1020 may be configured as or otherwise support a means for determining that the timing advance offset value is zero or is within a threshold range of zero. The communications manager 1020 may be configured as or otherwise support a means for transmitting to the UE an indication of an applied transient power mitigation scheme to be applied by the UE based on the timing advance offset being zero or within the threshold range of zero, the applied transient power mitigation scheme to mitigate potential interference to reception of the downlink message, at the UE, during a transient power duration associated with the UE turning off an uplink transmission chain used for transmitting the uplink message.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for mitigating interference of downlink transmissions. As such, this may reduce processing, increase utilization of communication resources, decrease signaling overhead, and reduce power consumption.

Figure 11:
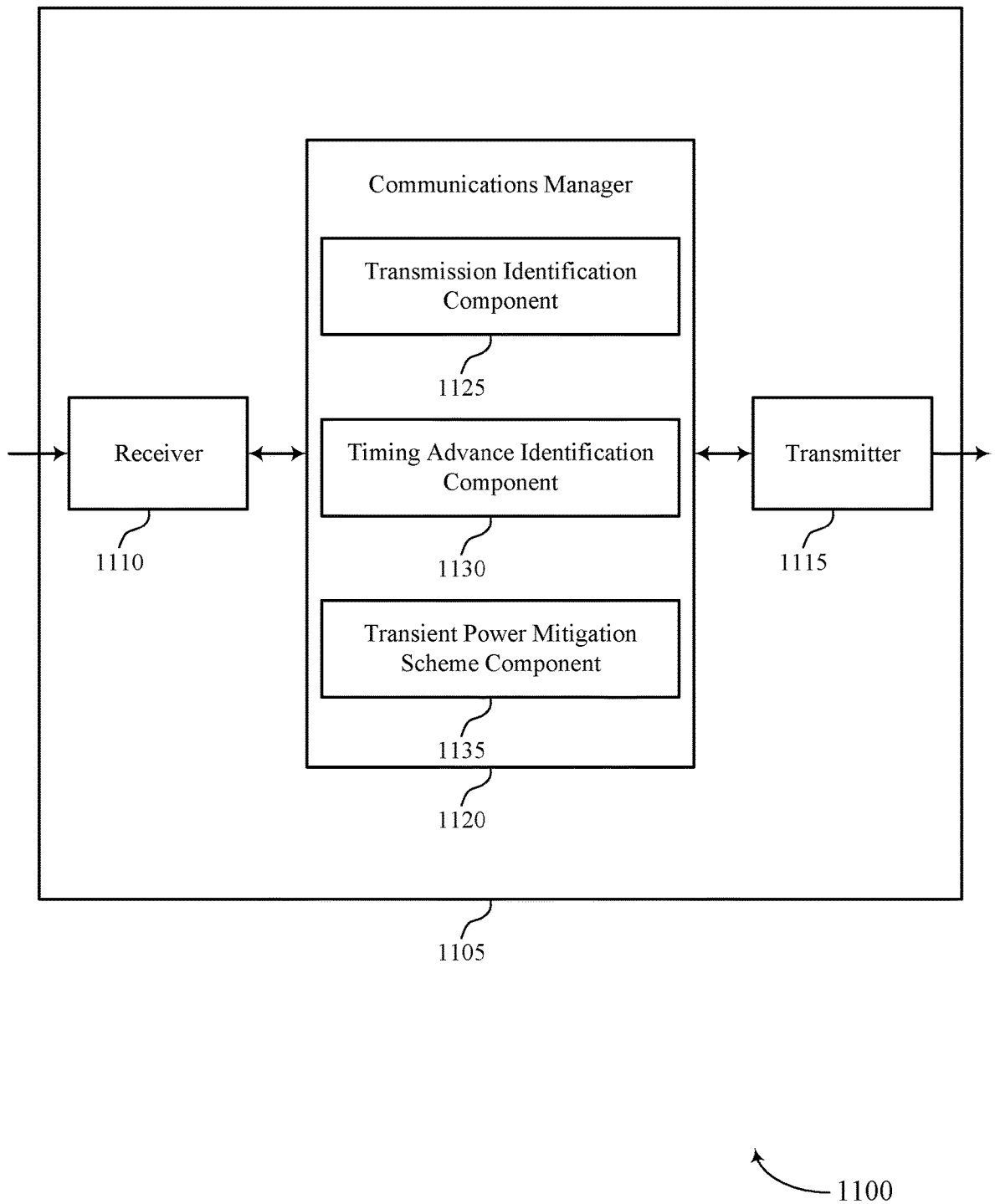

FIG. 11 shows a block diagram 1100 of a device 1105 that supports an on-off transient power time mask at a UE supporting full-duplex gNB operation in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to an on-off transient power time mask at a UE supporting full-duplex gNB operation). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to an on-off transient power time mask at a UE supporting full-duplex gNB operation). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of an on-off transient power time mask at a UE supporting full-duplex gNB operation as described herein. For example, the communications manager 1120 may include a transmission identification component 1125, a timing advance identification component 1130, a transient power mitigation scheme component 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. The transmission identification component 1125 may be configured as or otherwise support a means for identifying that a UE is scheduled to transmit an uplink message during one or more symbols of a first transmission time interval and that the UE is scheduled to receive a downlink message during a second transmission time interval subsequent to the first transmission time interval, where receipt of the uplink message is to be in accordance with a timing advance value and a timing advance offset value, and where the base station is operating in a full-duplex mode during one or more of the first transmission time interval and the second transmission time interval. The timing advance identification component 1130 may be configured as or otherwise support a means for determining that the timing advance offset value is zero or is within a threshold range of zero. The transient power mitigation scheme component 1135 may be configured as or otherwise support a means for transmitting to the UE an indication of an applied transient power mitigation scheme to be applied by the UE based on the timing advance offset being zero or within the threshold range of zero, the applied transient power mitigation scheme to mitigate potential interference to reception of the downlink message, at the UE, during a transient power duration associated with the UE turning off an uplink transmission chain used for transmitting the uplink message.

Figure 12:
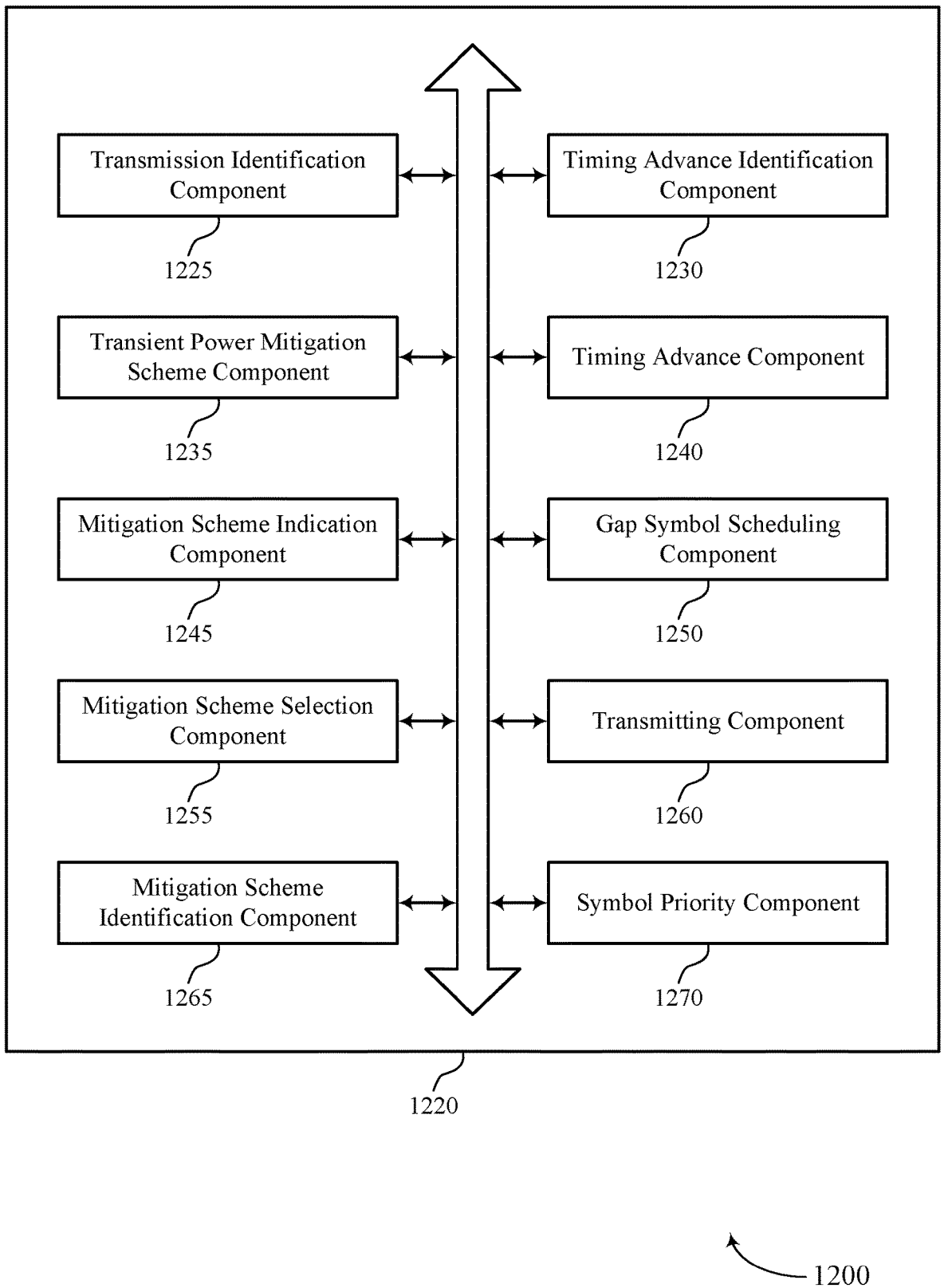
FIG. 12 shows a block diagram of a communications manager that supports an on-off transient power time mask at a UE supporting full-duplex gNB operation in accordance with aspects of the present disclosure.

FIG. 12 shows a block diagram 1200 of a communications manager 1220 that supports an on-off transient power time mask at a UE supporting full-duplex gNB operation in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of an on-off transient power time mask at a UE supporting full-duplex gNB operation as described herein. For example, the communications manager 1220 may include a transmission identification component 1225, a timing advance identification component 1230, a transient power mitigation scheme component 1235, a timing advance component 1240, a mitigation scheme indication component 1245, a gap symbol scheduling component 1250, a mitigation scheme selection component 1255, a transmitting component 1260, a mitigation scheme identification component 1265, a symbol priority component 1270, or any combination thereof. Each of these components may communicate, directly or indirectly, with one another (e.g., via one or more buses).

The communications manager 1220 may support wireless communication at a base station in accordance with examples as disclosed herein. The transmission identification component 1225 may be configured as or otherwise support a means for identifying that a UE is scheduled to transmit an uplink message during one or more symbols of a first transmission time interval and that the UE is scheduled to receive a downlink message during a second transmission time interval subsequent to the first transmission time interval, where receipt of the uplink message is to be in accordance with a timing advance value and a timing advance offset value, and where the base station is operating in a full-duplex mode during one or more of the first transmission time interval and the second transmission time interval. The timing advance identification component 1230 may be configured as or otherwise support a means for determining that the timing advance offset value is zero or is within a threshold range of zero. The transient power mitigation scheme component 1235 may be configured as or otherwise support a means for transmitting to the UE an indication of an applied transient power mitigation scheme to be applied by the UE based on the timing advance offset being zero or within the threshold range of zero, the applied transient power mitigation scheme to mitigate potential interference to reception of the downlink message, at the UE, during a transient power duration associated with the UE turning off an uplink transmission chain used for transmitting the uplink message.

In some examples, the timing advance component 1240 may be configured as or otherwise support a means for determining that a combination of the timing advance value and the timing advance offset value is less than a transient power duration of the UE, where transmitting the indication of the applied transient power mitigation scheme is further based on the combination of the timing advance value and the timing advance offset value being less than the transient power duration.

In some examples, to support transmitting the indication of the applied transient power mitigation scheme, the mitigation scheme indication component 1245 may be configured as or otherwise support a means for indicating a scheme from a set of multiple schemes, where a first scheme includes starting the transient power duration such that a majority of the transient power duration occurs in the first transmission time interval, and a second scheme includes insertion of a number of gap symbols between the transmission of the uplink message and the reception of the downlink message.

In some examples, the mitigation scheme selection component 1255 may be configured as or otherwise support a means for selecting either the first scheme or the second scheme based on a priority of a last symbol of the first transmission time interval.

In some examples, to support indicating the scheme, the mitigation scheme selection component 1255 may be configured as or otherwise support a means for identifying for the UE to use the second scheme based on the priority of the last symbol of the first transmission time interval being above a threshold, where the second scheme includes the insertion of a gap symbol during one or more initial symbols of the second transmission time interval.

In some examples, to support indicating the scheme, the mitigation scheme selection component 1255 may be configured as or otherwise support a means for identifying for the UE to use the first scheme based on the priority of the last symbol of the first transmission time interval being below a threshold.

In some examples, to support indicating the scheme, the transmitting component 1260 may be configured as or otherwise support a means for transmitting, to the UE, a gap symbol indication or an indication to apply a time mask within the last symbol of the first transmission time interval.

In some examples, to support indicating the scheme, the mitigation scheme identification component 1265 may be configured as or otherwise support a means for identifying for the UE to use the second scheme based on the priority of the last symbol of the first transmission time interval and the gap symbol indication or the indication to apply the time mask within the last symbol of the first transmission time interval.

In some examples, the symbol priority component 1270 may be configured as or otherwise support a means for determining the priority of the last symbol of the first transmission time interval based on whether the uplink message is aperiodic, semi-persistent, or periodic, on a channel type associated with the uplink message, on a content of the uplink message, on a pair of channel types associated with the uplink message and the downlink message, on the content of the uplink message and a content of the downlink message, or a combination thereof.

In some examples, to support transmitting the indication of the applied transient power mitigation scheme, the gap symbol scheduling component 1250 may be configured as or otherwise support a means for scheduling a number of gap symbols between the transmission of the uplink message and the reception of the downlink message.

In some examples, the gap symbol scheduling component 1250 may be configured as or otherwise support a means for scheduling the number of gap symbols based on a bandwidth part subcarrier spacing associated with the UE while transitioning from the first transmission time interval to the second transmission time interval.

Figure 13:
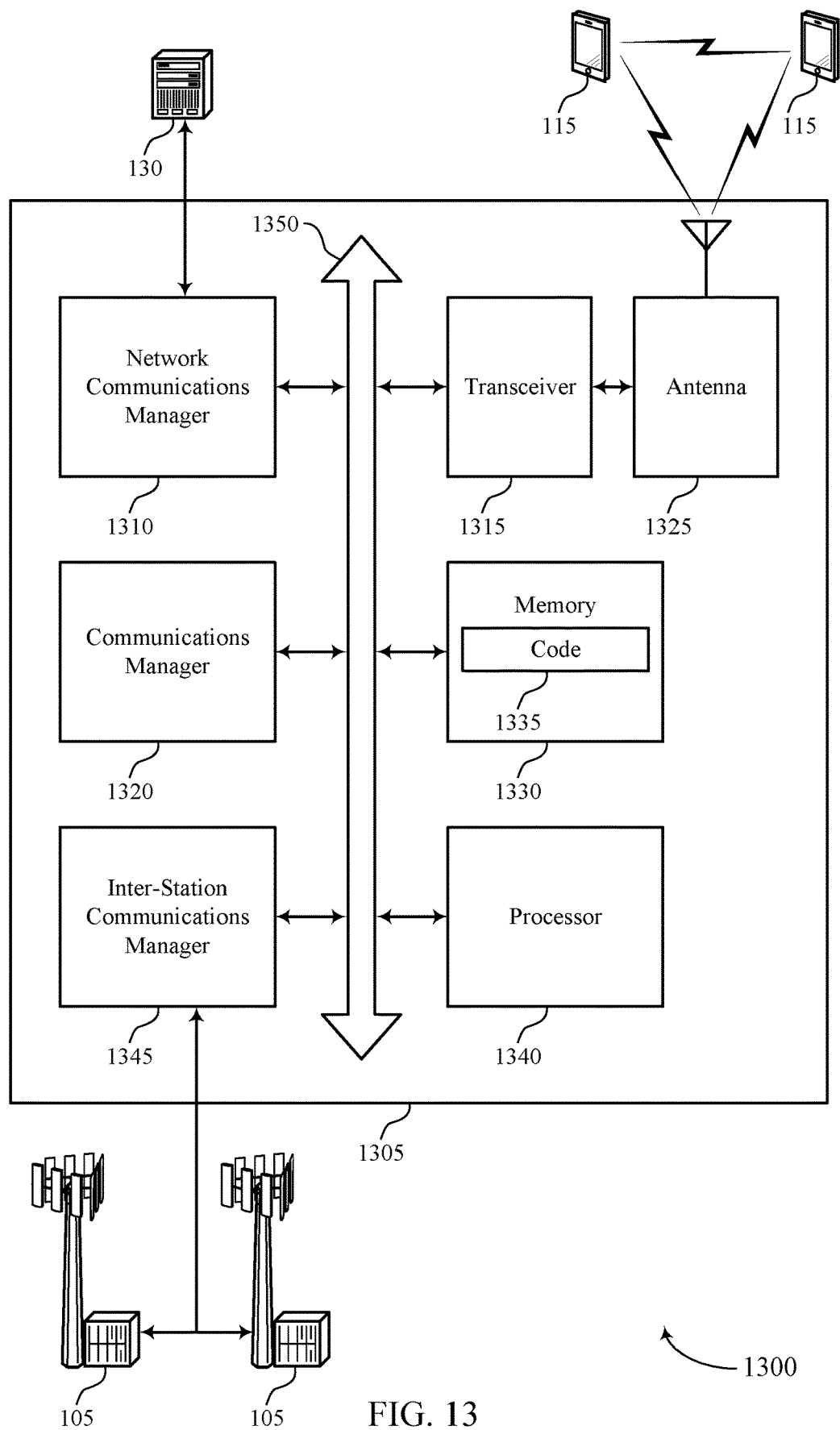
FIG. 13 shows a diagram of a system including a device that supports an on-off transient power time mask at a UE supporting full-duplex gNB operation in accordance with aspects of the present disclosure.

FIG. 13 shows a diagram of a system 1300 including a device 1305 that supports an on-off transient power time mask at a UE supporting full-duplex gNB operation in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting an on-off transient power time mask at a UE supporting full-duplex gNB operation). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a base station in accordance with examples as disclosed herein. For example, the communications manager 1320 may be configured as or otherwise support a means for identifying that a UE is scheduled to transmit an uplink message during one or more symbols of a first transmission time interval and that the UE is scheduled to receive a downlink message during a second transmission time interval subsequent to the first transmission time interval, where receipt of the uplink message is to be in accordance with a timing advance value and a timing advance offset value, and where the base station is operating in a full-duplex mode during one or more of the first transmission time interval and the second transmission time interval. The communications manager 1320 may be configured as or otherwise support a means for determining that the timing advance offset value is zero or is within a threshold range of zero. The communications manager 1320 may be configured as or otherwise support a means for transmitting to the UE an indication of an applied transient power mitigation scheme to be applied by the UE based on the timing advance offset being zero or within the threshold range of zero, the applied transient power mitigation scheme to mitigate potential interference to reception of the downlink message, at the UE, during a transient power duration associated with the UE turning off an uplink transmission chain used for transmitting the uplink message.

By including or configuring the communications manager 1320 in accordance with examples as described herein, the device 1305 may support techniques for mitigating interference of downlink transmissions. As such, these techniques may improve communication reliability, reduced latency, improved user experience related to reduced processing of downlink messages, reduced power consumption, more efficient utilization of communication resources, improved coordination between devices, longer battery life, and an improved utilization of processing capability.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of an on-off transient power time mask at a UE supporting full-duplex gNB operation as described herein, or the processor 1340 and the memory 1330 may be otherwise configured to perform or support such operations.

Figure 14:
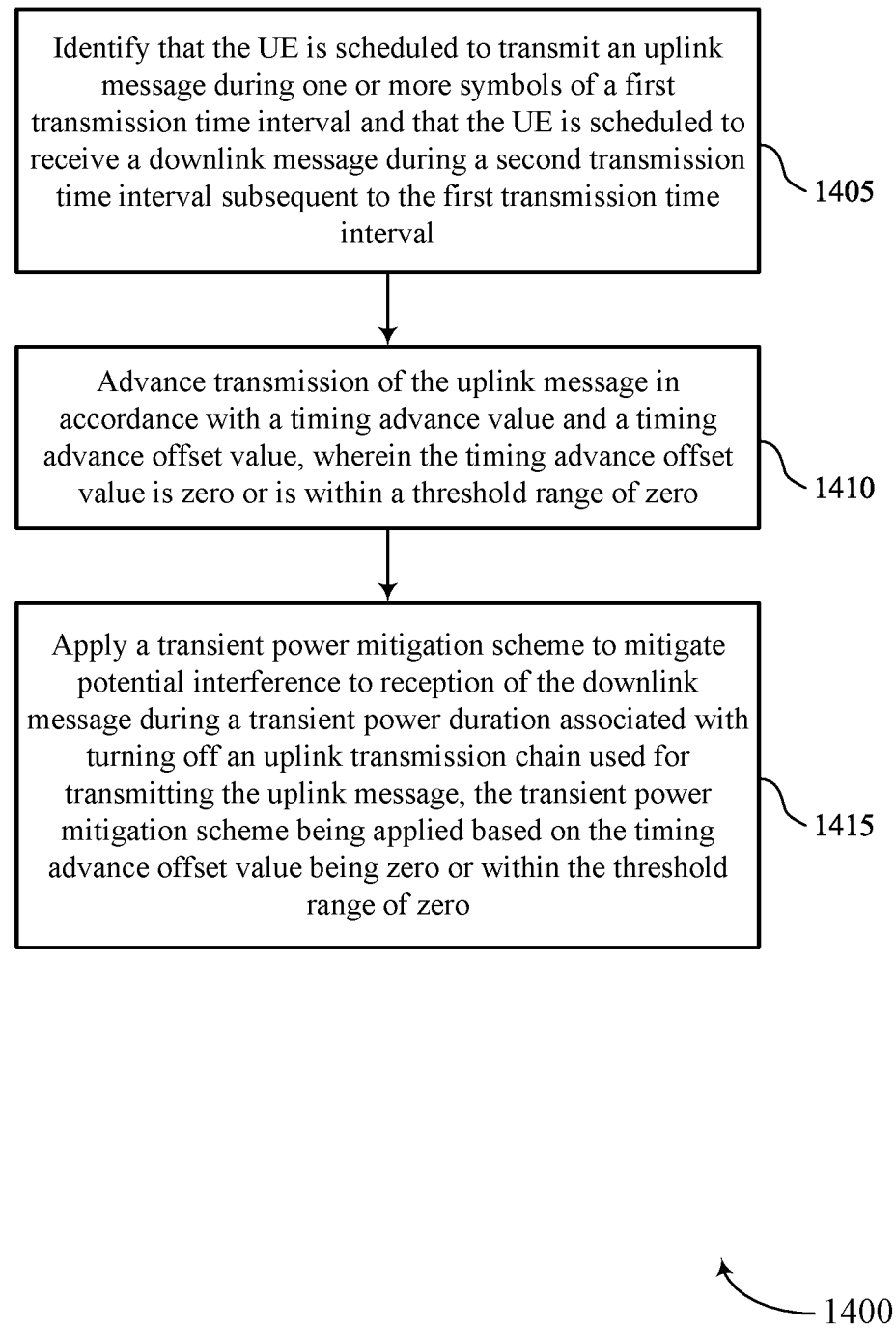
FIGS. 14 through 17 show flowcharts illustrating methods that support an on-off transient power time mask at a UE supporting full-duplex gNB operation in accordance with aspects of the present disclosure.

FIG. 14 shows a flowchart illustrating a method 1400 that supports an on-off transient power time mask at a UE supporting full-duplex gNB operation in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include identifying that the UE is scheduled to transmit an uplink message during one or more symbols of a first transmission time interval and that the UE is scheduled to receive a downlink message during a second transmission time interval subsequent to the first transmission time interval. The operations of 1405 may be performed in accordance with examples as disclosed herein. In some examples, aspects of the operations of 1405 may be performed by a transmission identification component 825 as described with reference to FIG. 8.

At 1410, the method may include advancing transmission of the uplink message in accordance with a timing advance value and a timing advance offset value, where the timing advance offset value is zero or is within a threshold range of zero. The operations of 1410 may be performed in accordance with examples as disclosed herein. In some examples, aspects of the operations of 1410 may be performed by a timing advance component 830 as described with reference to FIG. 8.

At 1415, the method may include applying a transient power mitigation scheme to mitigate potential interference to reception of the downlink message during a transient power duration associated with turning off an uplink transmission chain used for transmitting the uplink message, the transient power mitigation scheme being applied based on the timing advance offset value being zero or within the threshold range of zero. The operations of 1415 may be performed in accordance with examples as disclosed herein. In some examples, aspects of the operations of 1415 may be performed by a transient power mitigation scheme component 835 as described with reference to FIG. 8.

Figure 15:
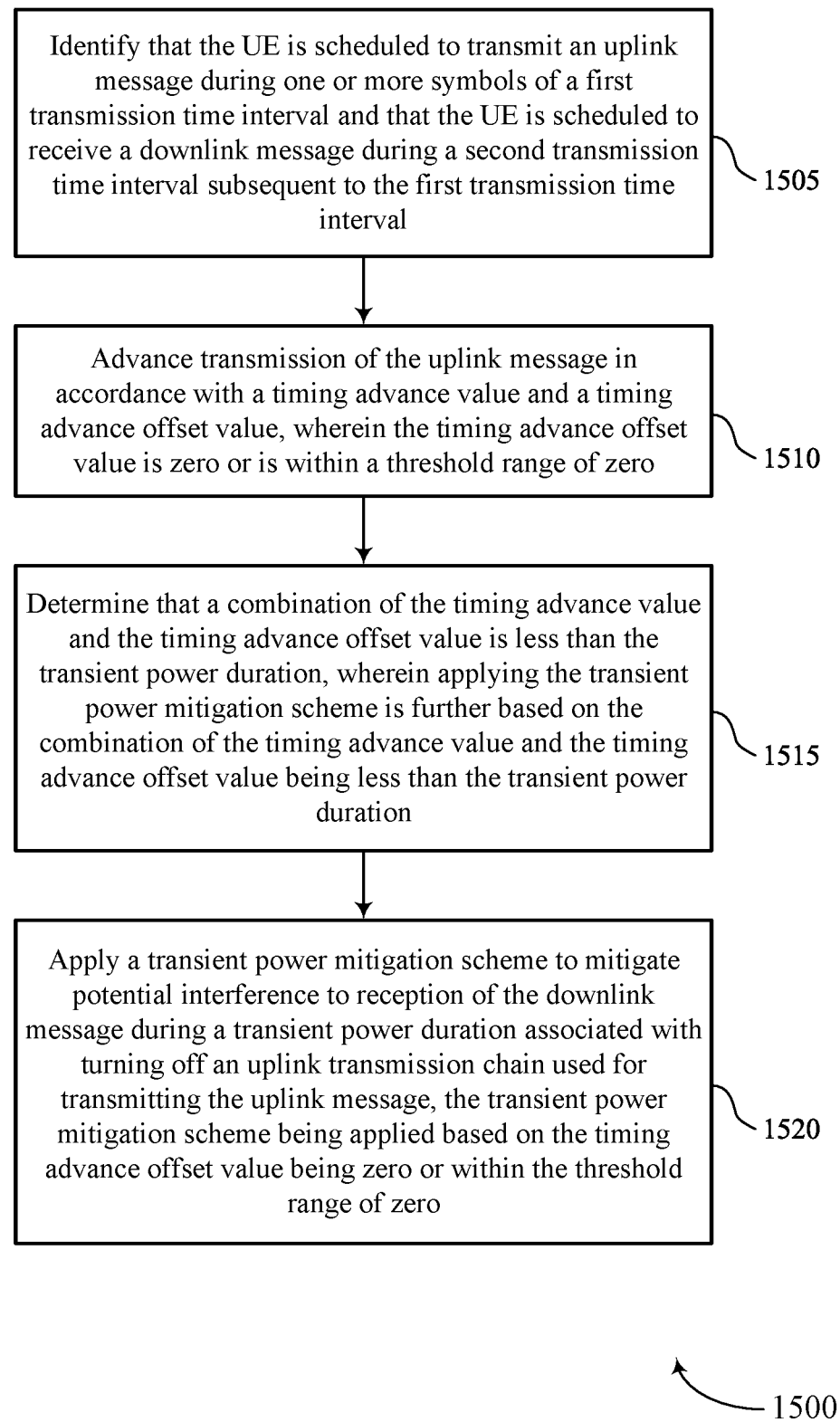

FIG. 15 shows a flowchart illustrating a method 1500 that supports an on-off transient power time mask at a UE supporting full-duplex gNB operation in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include identifying that the UE is scheduled to transmit an uplink message during one or more symbols of a first transmission time interval and that the UE is scheduled to receive a downlink message during a second transmission time interval subsequent to the first transmission time interval. The operations of 1505 may be performed in accordance with examples as disclosed herein. In some examples, aspects of the operations of 1505 may be performed by a transmission identification component 825 as described with reference to FIG. 8.

At 1510, the method may include advancing transmission of the uplink message in accordance with a timing advance value and a timing advance offset value, where the timing advance offset value is zero or is within a threshold range of zero. The operations of 1510 may be performed in accordance with examples as disclosed herein. In some examples, aspects of the operations of 1510 may be performed by a timing advance component 830 as described with reference to FIG. 8.

At 1515, the method may include determining that a combination of the timing advance value and the timing advance offset value is less than the transient power duration, where applying the transient power mitigation scheme is further based on the combination of the timing advance value and the timing advance offset value being less than the transient power duration. The operations of 1515 may be performed in accordance with examples as disclosed herein. In some examples, aspects of the operations of 1515 may be performed by a timing advance component 830 as described with reference to FIG. 8.

At 1520, the method may include applying a transient power mitigation scheme to mitigate potential interference to reception of the downlink message during a transient power duration associated with turning off an uplink transmission chain used for transmitting the uplink message, the transient power mitigation scheme being applied based on the timing advance offset value being zero or within the threshold range of zero. The operations of 1520 may be performed in accordance with examples as disclosed herein. In some examples, aspects of the operations of 1520 may be performed by a transient power mitigation scheme component 835 as described with reference to FIG. 8.

Figure 16:
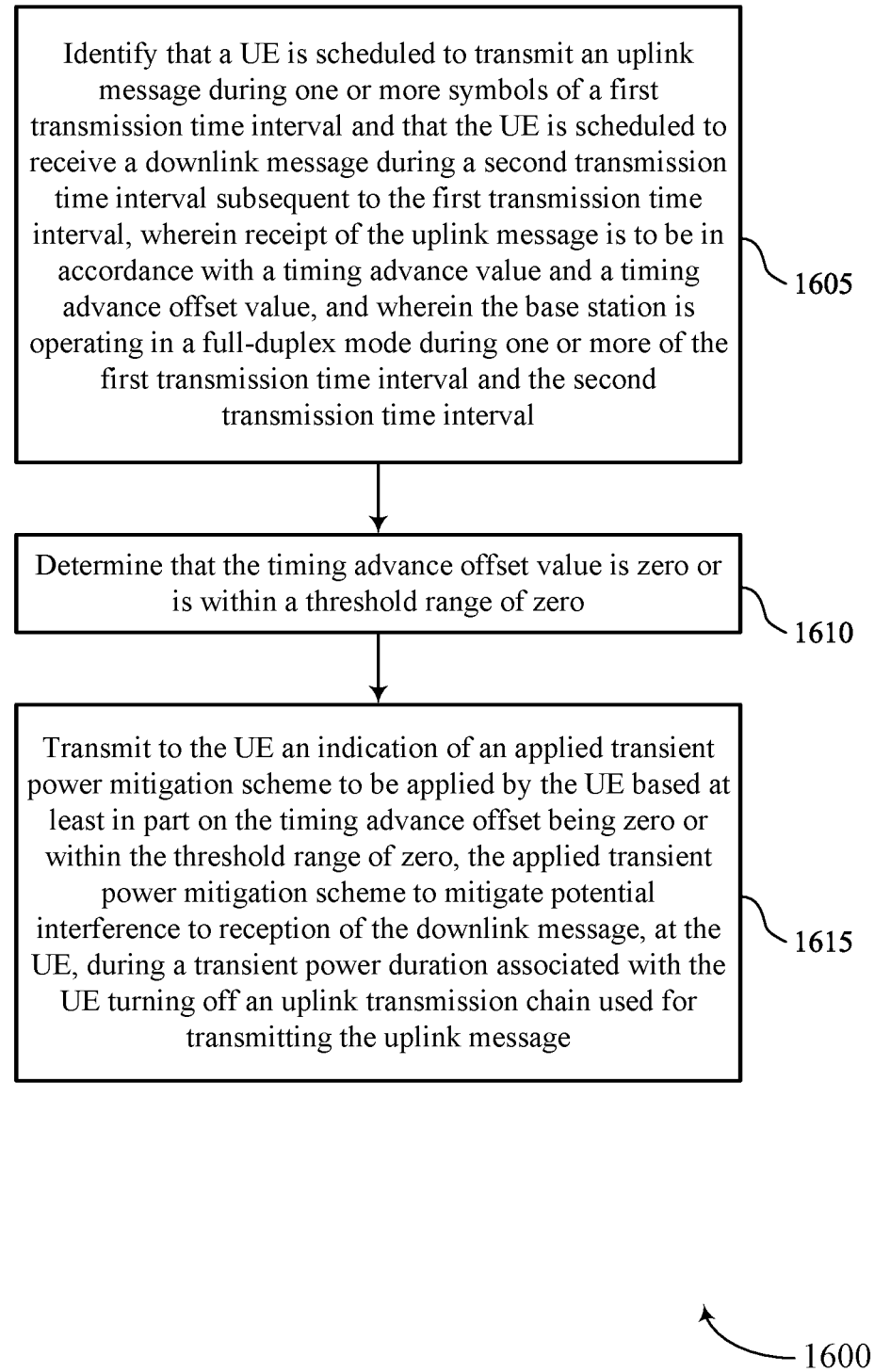

FIG. 16 shows a flowchart illustrating a method 1600 that supports an on-off transient power time mask at a UE supporting full-duplex gNB operation in accordance with aspects of the present disclosure. The operations of the method 1600 may be implemented by a base station or its components as described herein. For example, the operations of the method 1600 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1605, the method may include identifying that a UE is scheduled to transmit an uplink message during one or more symbols of a first transmission time interval and that the UE is scheduled to receive a downlink message during a second transmission time interval subsequent to the first transmission time interval, where receipt of the uplink message is to be in accordance with a timing advance value and a timing advance offset value, and where the base station is operating in a full-duplex mode during one or more of the first transmission time interval and the second transmission time interval. The operations of 1605 may be performed in accordance with examples as disclosed herein. In some examples, aspects of the operations of 1605 may be performed by a transmission identification component 1225 as described with reference to FIG. 12.

At 1610, the method may include determining that the timing advance offset value is zero or is within a threshold range of zero. The operations of 1610 may be performed in accordance with examples as disclosed herein. In some examples, aspects of the operations of 1610 may be performed by a timing advance identification component 1230 as described with reference to FIG. 12.

At 1615, the method may include transmitting to the UE an indication of an applied transient power mitigation scheme to be applied by the UE based on the timing advance offset being zero or within the threshold range of zero, the applied transient power mitigation scheme to mitigate potential interference to reception of the downlink message, at the UE, during a transient power duration associated with the UE turning off an uplink transmission chain used for transmitting the uplink message. The operations of 1615 may be performed in accordance with examples as disclosed herein. In some examples, aspects of the operations of 1615 may be performed by a transient power mitigation scheme component 1235 as described with reference to FIG. 12.

Figure 17:
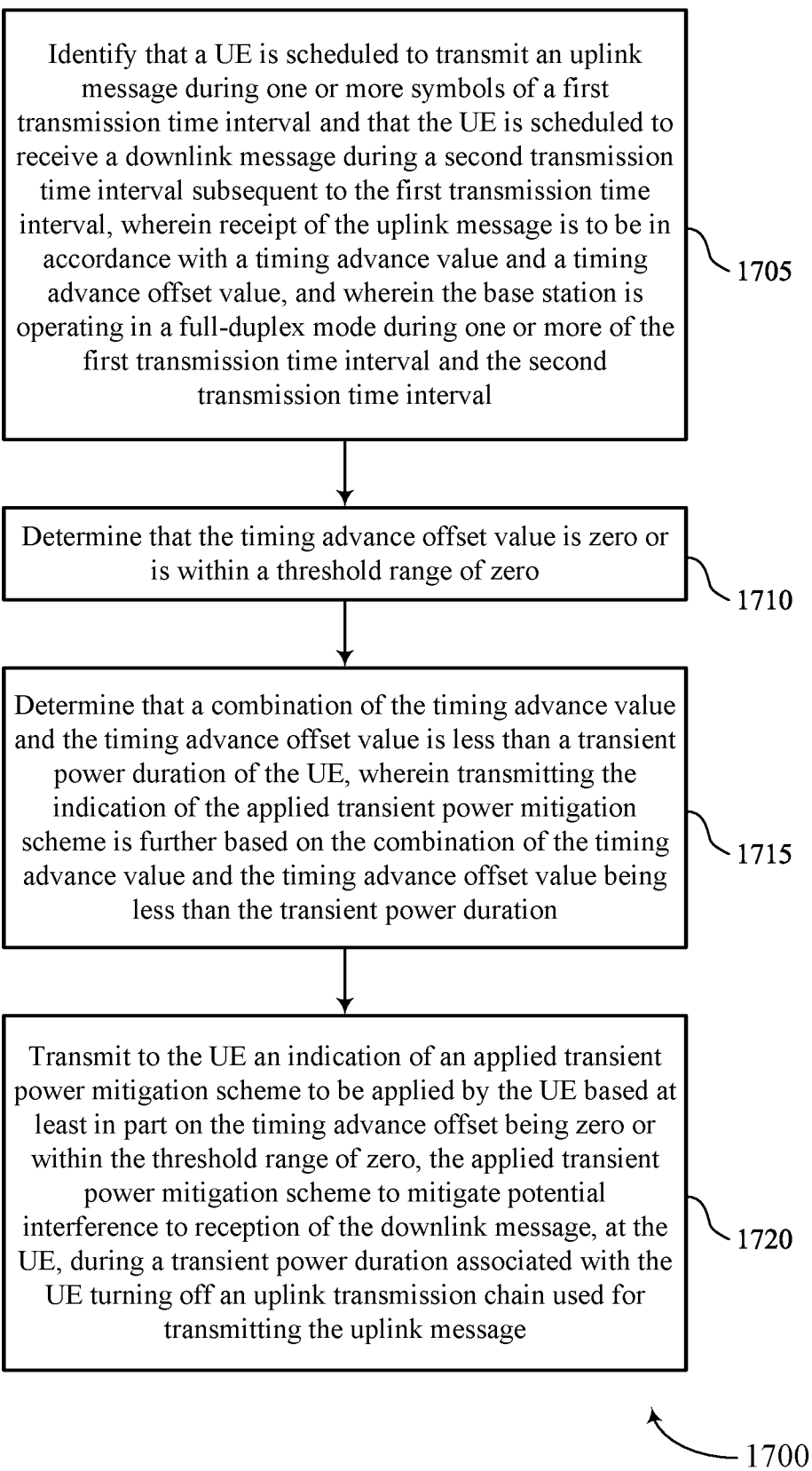

FIG. 17 shows a flowchart illustrating a method 1700 that supports an on-off transient power time mask at a UE supporting full-duplex gNB operation in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include identifying that a UE is scheduled to transmit an uplink message during one or more symbols of a first transmission time interval and that the UE is scheduled to receive a downlink message during a second transmission time interval subsequent to the first transmission time interval, where receipt of the uplink message is to be in accordance with a timing advance value and a timing advance offset value, and where the base station is operating in a full-duplex mode during one or more of the first transmission time interval and the second transmission time interval. The operations of 1705 may be performed in accordance with examples as disclosed herein. In some examples, aspects of the operations of 1705 may be performed by a transmission identification component 1225 as described with reference to FIG. 12.

At 1710, the method may include determining that the timing advance offset value is zero or is within a threshold range of zero. The operations of 1710 may be performed in accordance with examples as disclosed herein. In some examples, aspects of the operations of 1710 may be performed by a timing advance identification component 1230 as described with reference to FIG. 12.

At 1715, the method may include determining that a combination of the timing advance value and the timing advance offset value is less than a transient power duration of the UE, where transmitting the indication of the applied transient power mitigation scheme is further based on the combination of the timing advance value and the timing advance offset value being less than the transient power duration. The operations of 1715 may be performed in accordance with examples as disclosed herein. In some examples, aspects of the operations of 1715 may be performed by a timing advance component 1240 as described with reference to FIG. 12.

At 1720, the method may include transmitting to the UE an indication of an applied transient power mitigation scheme to be applied by the UE based on the timing advance offset being zero or within the threshold range of zero, the applied transient power mitigation scheme to mitigate potential interference to reception of the downlink message, at the UE, during a transient power duration associated with the UE turning off an uplink transmission chain used for transmitting the uplink message. The operations of 1720 may be performed in accordance with examples as disclosed herein. In some examples, aspects of the operations of 1720 may be performed by a transient power mitigation scheme component 1235 as described with reference to FIG. 12.

The following provides an overview of aspects of the present disclosure:

Aspect 1: A method for wireless communication at a UE, comprising: identifying that the UE is scheduled to transmit an uplink message during one or more symbols of a first TTI and that the UE is scheduled to receive a downlink message during a second TTI subsequent to the first TTI; advancing transmission of the uplink message in accordance with a TA value and a TA offset value, wherein the TA offset value is zero or is within a threshold range of zero; and applying a transient power mitigation scheme to mitigate potential interference to reception of the downlink message during a transient power duration associated with turning off an uplink transmission chain used for transmitting the uplink message, the transient power mitigation scheme being applied based at least in part on the TA offset value being zero or within the threshold range of zero.

Aspect 2: The method of aspect 1, further comprising: determining that a combination of the TA value and the TA offset value is less than the transient power duration, wherein applying the transient power mitigation scheme is further based on the combination of the TA value and the TA offset value being less than the transient power duration.

Aspect 3: The method of any of aspects 1 through 2, wherein applying the transient power mitigation scheme further comprises: selecting from a plurality of schemes, wherein a first scheme comprises starting the transient power duration such that a majority of the transient power duration occurs in the first TTI, and a second scheme comprises insertion of a number of gap symbols between the transmission of the uplink message and the reception of the downlink message.

Aspect 4: The method of aspect 3, wherein selecting from the plurality of schemes further comprises: determining to use either the first scheme or the second scheme based at least in part on a priority of a last symbol of the first TTI.

Aspect 5: The method of aspect 4, wherein determining to use either the first scheme or the second scheme further comprises: using the second scheme based at least in part on the priority of the last symbol of the first TTI being above a threshold, wherein the second scheme includes the insertion of a gap symbol during one or more initial symbols of the second TTI.

Aspect 6: The method of any of aspects 4 through 5, wherein determining to use either the first scheme or the second scheme further comprises: using the first scheme based at least in part on the priority of the last symbol of the first TTI being below a threshold.

Aspect 7: The method of any of aspects 4 through 6, wherein determining to use either the first scheme or the second scheme further comprises: receiving, at the UE, a gap symbol indication or an indication to apply a time mask within the last symbol of the first TTI; and using the second scheme based at least in part on the priority of the last symbol of the first TTI and the gap symbol indication or the indication to apply the time mask within the last symbol of the first TTI.

Aspect 8: The method of any of aspects 4 through 7, further comprising: determining the priority of the last symbol of the first TTI based at least in part on whether the uplink message is aperiodic, semi-persistent, or periodic, on a channel type associated with the uplink message, on a content of the uplink message, on a pair of channel types associated with the uplink message and the downlink message, on the content of the uplink message and a content of the downlink message, or a combination thereof.

Aspect 9: The method of any of aspects 1 through 8, wherein applying the transient power mitigation scheme further comprises: starting the transient power duration during a last symbol of the first TTI such that a majority of the transient power duration occurs in the first TTI.

Aspect 10: The method of aspect 9, further comprising: determining the transient power duration and an associated start value for the transient power duration based at least in part on a transient period start table configured at the UE, wherein the transient period start table comprises a set of one or more transient power durations and associated start values.

Aspect 11: The method of aspect 10, wherein each transient power duration of the set of one or more transient power durations is associated with a range of start values.

Aspect 12: The method of aspect 11, further comprising: selecting a start value from the range of start values based at least in part on a priority of the last symbol of the first TTI and a priority of a first symbol of the second TTI, a priority of channels associated with the uplink message and the downlink message, receiving a radio resource control message indicating the start value, or a combination thereof.

Aspect 13: The method of any of aspects 1 through 12, wherein applying the transient power mitigation scheme further comprises: applying a number of gap symbols between the transmission of the uplink message and the reception of the downlink message.

Aspect 14: The method of aspect 13, further comprising: determining the number of gap symbols based at least in part on a bandwidth part subcarrier spacing associated with the UE while transitioning from the first TTI to the second TTI.

Aspect 15: The method of aspect 14, further comprising: determining to place the number of gap symbols at an end of the first TTI or at a start of the second TTI based at least in part on a priority of the uplink message and a priority of the downlink message.

Aspect 16: The method of any of aspects 1 through 15, further comprising: receiving an indication for a virtual subcarrier spacing increase for a last symbol of the first TTI; configuring the virtual subcarrier spacing increase using a comb frequency allocation corresponding to one or more time domain repetitions.

Aspect 17: The method of aspect 16, further comprising: determining to drop one or more of the one or more time domain repetitions, wherein the uplink message is allocated to a pattern of frequency tones based at least in part on the comb frequency allocation.

Aspect 18: The method of any of aspects 16 through 17, wherein. the comb frequency allocation is one of all even tones within a comb or all odd tones within the comb, and the uplink message includes a demodulation reference signal during the last symbol of the first TTI Aspect 19: A method for wireless communication at a base station, comprising: identifying that a UE is scheduled to transmit an uplink message during one or more symbols of a first TTI and that the UE is scheduled to receive a downlink message during a second TTI subsequent to the first TTI, wherein receipt of the uplink message is to be in accordance with a TA value and a TA offset value, and wherein the base station is operating in a full-duplex mode during one or more of the first TTI and the second TTI; determining that the TA offset value is zero or is within a threshold range of zero; and transmitting to the UE an indication of an applied transient power mitigation scheme to be applied by the UE based at least in part on the TA offset being zero or within the threshold range of zero, the applied transient power mitigation scheme to mitigate potential interference to reception of the downlink message, at the UE, during a transient power duration associated with the UE turning off an uplink transmission chain used for transmitting the uplink message.

Aspect 20: The method of aspect 19, further comprising: determining that a combination of the TA value and the TA offset value is less than a transient power duration of the UE, wherein transmitting the indication of the applied transient power mitigation scheme is further based on the combination of the TA value and the TA offset value being less than the transient power duration.

Aspect 21: The method of any of aspects 19 through 20, wherein transmitting the indication of the applied transient power mitigation scheme further comprises: indicating a scheme from a plurality of schemes, wherein a first scheme comprises starting the transient power duration such that a majority of the transient power duration occurs in the first TTI, and a second scheme comprises insertion of a number of gap symbols between the transmission of the uplink message and the reception of the downlink message.

Aspect 22: The method of aspect 21, further comprising: selecting either the first scheme or the second scheme based at least in part on a priority of a last symbol of the first TTI.

Aspect 23: The method of aspect 22, wherein indicating the scheme further comprises: identifying for the UE to use the second scheme based at least in part on the priority of the last symbol of the first TTI being above a threshold, wherein the second scheme includes the insertion of a gap symbol during one or more initial symbols of the second TTI.

Aspect 24: The method of any of aspects 22 through 23, wherein indicating the scheme further comprises: identifying for the UE to use the first scheme based at least in part on the priority of the last symbol of the first TTI being below a threshold.

Aspect 25: The method of any of aspects 22 through 24, wherein indicating the scheme further comprises: transmitting, to the UE, a gap symbol indication or an indication to apply a time mask within the last symbol of the first TTI; and identifying for the UE to use the second scheme based at least in part on the priority of the last symbol of the first TTI and the gap symbol indication or the indication to apply the time mask within the last symbol of the first TTI.

Aspect 26: The method of any of aspects 22 through 25, further comprising: determining the priority of the last symbol of the first TTI based at least in part on whether the uplink message is aperiodic, semi-persistent, or periodic, on a channel type associated with the uplink message, on a content of the uplink message, on a pair of channel types associated with the uplink message and the downlink message, on the content of the uplink message and a content of the downlink message, or a combination thereof.

Aspect 27: The method of any of aspects 19 through 26, wherein transmitting the indication of the applied transient power mitigation scheme further comprises: scheduling a number of gap symbols between the transmission of the uplink message and the reception of the downlink message.

Aspect 28: The method of aspect 27, further comprising: scheduling the number of gap symbols based at least in part on a bandwidth part subcarrier spacing associated with the UE while transitioning from the first TTI to the second TTI.

Aspect 29: An apparatus for wireless communication at a UE, comprising a processor; memory coupled with the processor; and instructions stored in the memory and executable by the processor to cause the apparatus to perform a method of any of aspects 1 through 18.

Aspect 30: An apparatus for wireless communication at a UE, comprising at least one means for performing a method of any of aspects 1 through 18.

Aspect 31: A non-transitory computer-readable medium storing code for wireless communication at a UE, the code comprising instructions executable by a processor to perform a method of any of aspects 1 through 18.

Aspect 32: An apparatus for wireless communication at a base station, comprising a processor; memory coupled with the processor; and instructions stored in the memory and executable by the processor to cause the apparatus to perform a method of any of aspects 19 through 28.

Aspect 33: An apparatus for wireless communication at a base station, comprising at least one means for performing a method of any of aspects 19 through 28.

Aspect 34: A non-transitory computer-readable medium storing code for wireless communication at a base station, the code comprising instructions executable by a processor to perform a method of any of aspects 19 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    identifying that the UE is scheduled to transmit an uplink message during one or more symbols of a first transmission time interval and that the UE is scheduled to receive a downlink message during a second transmission time interval subsequent to the first transmission time interval;
    advancing transmission of the uplink message in accordance with a timing advance value and a timing advance offset value, wherein the timing advance offset value is zero or is within a threshold range of zero; and
    applying a transient power mitigation scheme to mitigate potential interference to reception of the downlink message during a transient power duration associated with turning off an uplink transmission chain used for transmitting the uplink message, the transient power mitigation scheme being applied based at least in part on the timing advance offset value being zero or within the threshold range of zero.

2. The method of claim 1, further comprising:
    determining that a combination of the timing advance value and the timing advance offset value is less than the transient power duration, wherein applying the transient power mitigation scheme is further based on the combination of the timing advance value and the timing advance offset value being less than the transient power duration.

3. The method of claim 1, wherein applying the transient power mitigation scheme further comprises:
    selecting from a plurality of schemes, wherein a first scheme comprises starting the transient power duration such that a majority of the transient power duration occurs in the first transmission time interval, and a second scheme comprises insertion of a number of gap symbols between the transmission of the uplink message and the reception of the downlink message.

4. The method of claim 3, wherein selecting from the plurality of schemes further comprises:
    determining to use either the first scheme or the second scheme based at least in part on a priority of a last symbol of the first transmission time interval.

5. The method of claim 4, wherein determining to use either the first scheme or the second scheme further comprises:
    using the second scheme based at least in part on the priority of the last symbol of the first transmission time interval being above a threshold, wherein the second scheme includes the insertion of a gap symbol during one or more initial symbols of the second transmission time interval.

6. The method of claim 4, wherein determining to use either the first scheme or the second scheme further comprises:
    using the first scheme based at least in part on the priority of the last symbol of the first transmission time interval being below a threshold.

7. The method of claim 4, wherein determining to use either the first scheme or the second scheme further comprises:
    receiving, at the UE, a gap symbol indication or an indication to apply a time mask within the last symbol of the first transmission time interval; and
    using the second scheme based at least in part on the priority of the last symbol of the first transmission time interval and the gap symbol indication or the indication to apply the time mask within the last symbol of the first transmission time interval.

8. The method of claim 4, further comprising:
    determining the priority of the last symbol of the first transmission time interval based at least in part on whether the uplink message is aperiodic, semi-persistent, or periodic, on a channel type associated with the uplink message, on a content of the uplink message, on a pair of channel types associated with the uplink message and the downlink message, on the content of the uplink message and a content of the downlink message, or a combination thereof.

9. The method of claim 1, wherein applying the transient power mitigation scheme further comprises:
    starting the transient power duration during a last symbol of the first transmission time interval such that a majority of the transient power duration occurs in the first transmission time interval.

10. The method of claim 9, further comprising:
    determining the transient power duration and an associated start value for the transient power duration based at least in part on a transient period start table configured at the UE, wherein the transient period start table comprises a set of one or more transient power durations and associated start values.

11. The method of claim 10, wherein each transient power duration of the set of one or more transient power durations is associated with a range of start values.

12. The method of claim 11, further comprising:
    selecting a start value from the range of start values based at least in part on a priority of the last symbol of the first transmission time interval and a priority of a first symbol of the second transmission time interval, a priority of channels associated with the uplink message and the downlink message, receiving a radio resource control message indicating the start value, or a combination thereof.

13. The method of claim 1, wherein applying the transient power mitigation scheme further comprises:
    applying a number of gap symbols between the transmission of the uplink message and the reception of the downlink message.

14. The method of claim 13, further comprising:
    determining the number of gap symbols based at least in part on a bandwidth part subcarrier spacing associated with the UE while transitioning from the first transmission time interval to the second transmission time interval.

15. The method of claim 14, further comprising:
    determining to place the number of gap symbols at an end of the first transmission time interval or at a start of the second transmission time interval based at least in part on a priority of the uplink message and a priority of the downlink message.

16. The method of claim 1, further comprising:
receiving an indication for a virtual subcarrier spacing increase for a last symbol of the first transmission time interval;
configuring the virtual subcarrier spacing increase using a comb frequency allocation corresponding to one or more time domain repetitions.

17. The method of claim 16, further comprising:
determining to drop one or more of the one or more time domain repetitions, wherein the uplink message is allocated to a pattern of frequency tones based at least in part on the comb frequency allocation.

18. The method of claim 16, wherein:
the comb frequency allocation is one of all even tones within a comb or all odd tones within the comb, and
the uplink message includes a demodulation reference signal during the last symbol of the first transmission time interval.

19. A method for wireless communication at a base station, comprising:
identifying that a user equipment (UE) is scheduled to transmit an uplink message during one or more symbols of a first transmission time interval and that the UE is scheduled to receive a downlink message during a second transmission time interval subsequent to the first transmission time interval, wherein receipt of the uplink message is to be in accordance with a timing advance value and a timing advance offset value, and wherein the base station is operating in a full-duplex mode during one or more of the first transmission time interval and the second transmission time interval;
determining that the timing advance offset value is zero or is within a threshold range of zero; and
transmitting to the UE an indication of an applied transient power mitigation scheme to be applied by the UE based at least in part on the timing advance offset being zero or within the threshold range of zero, the applied transient power mitigation scheme to mitigate potential interference to reception of the downlink message, at the UE, during a transient power duration associated with the UE turning off an uplink transmission chain used for transmitting the uplink message.

20. The method of claim 19, further comprising:
determining that a combination of the timing advance value and the timing advance offset value is less than a transient power duration of the UE, wherein transmitting the indication of the applied transient power mitigation scheme is further based on the combination of the timing advance value and the timing advance offset value being less than the transient power duration.

21. The method of claim 19, wherein transmitting the indication of the applied transient power mitigation scheme further comprises:
indicating a scheme from a plurality of schemes, wherein a first scheme comprises starting the transient power duration such that a majority of the transient power duration occurs in the first transmission time interval, and a second scheme comprises insertion of a number of gap symbols between the transmission of the uplink message and the reception of the downlink message.

22. The method of claim 21, further comprising:
selecting either the first scheme or the second scheme based at least in part on a priority of a last symbol of the first transmission time interval.

23. The method of claim 22, wherein indicating the scheme further comprises:
identifying for the UE to use the second scheme based at least in part on the priority of the last symbol of the first transmission time interval being above a threshold, wherein the second scheme includes the insertion of a gap symbol during one or more initial symbols of the second transmission time interval.

24. The method of claim 22, wherein indicating the scheme further comprises:
identifying for the UE to use the first scheme based at least in part on the priority of the last symbol of the first transmission time interval being below a threshold.

25. The method of claim 22, wherein indicating the scheme further comprises:
transmitting, to the UE, a gap symbol indication or an indication to apply a time mask within the last symbol of the first transmission time interval; and
identifying for the UE to use the second scheme based at least in part on the priority of the last symbol of the first transmission time interval and the gap symbol indication or the indication to apply the time mask within the last symbol of the first transmission time interval.

26. The method of claim 22, further comprising:
determining the priority of the last symbol of the first transmission time interval based at least in part on whether the uplink message is aperiodic, semi-persistent, or periodic, on a channel type associated with the uplink message, on a content of the uplink message, on a pair of channel types associated with the uplink message and the downlink message, on the content of the uplink message and a content of the downlink message, or a combination thereof.

27. The method of claim 19, wherein transmitting the indication of the applied transient power mitigation scheme further comprises:
scheduling a number of gap symbols between the transmission of the uplink message and the reception of the downlink message.

28. The method of claim 27, further comprising:
scheduling the number of gap symbols based at least in part on a bandwidth part subcarrier spacing associated with the UE while transitioning from the first transmission time interval to the second transmission time interval.

29. An apparatus for wireless communication at a user equipment (UE), comprising:
a processor;
memory coupled with the processor; and
instructions stored in the memory and executable by the processor to cause the apparatus to:
identify that the UE is scheduled to transmit an uplink message during one or more symbols of a first transmission time interval and that the UE is scheduled to receive a downlink message during a second transmission time interval subsequent to the first transmission time interval;
advance transmission of the uplink message in accordance with a timing advance value and a timing advance offset value, wherein the timing advance offset value is zero or is within a threshold range of zero; and
apply a transient power mitigation scheme to mitigate potential interference to reception of the downlink message during a transient power duration associated with turning off an uplink transmission chain used for transmitting the uplink message, the transient power mitigation scheme being applied based at least in part on the timing advance offset value being zero or within the threshold range of zero.

30. An apparatus for wireless communication at a base station, comprising:
- a processor;
- memory coupled with the processor; and
- instructions stored in the memory and executable by the processor to cause the apparatus to:
  - identify that a user equipment (UE) is scheduled to transmit an uplink message during one or more symbols of a first transmission time interval and that the UE is scheduled to receive a downlink message during a second transmission time interval subsequent to the first transmission time interval, wherein receipt of the uplink message is to be in accordance with a timing advance value and a timing advance offset value, and wherein the base station is operating in a full-duplex mode during one or more of the first transmission time interval and the second transmission time interval;
  - determine that the timing advance offset value is zero or is within a threshold range of zero; and
  - transmit to the UE an indication of an applied transient power mitigation scheme to be applied by the UE based at least in part on the timing advance offset being zero or within the threshold range of zero, the applied transient power mitigation scheme to mitigate potential interference to reception of the downlink message, at the UE, during a transient power duration associated with the UE turning off an uplink transmission chain used for transmitting the uplink message.

* * * * *